(12) United States Patent
Araki

(10) Patent No.: US 9,396,050 B2
(45) Date of Patent: Jul. 19, 2016

(54) DISTRIBUTED EXECUTION SYSTEM AND DISTRIBUTED PROGRAM EXECUTION METHOD

(75) Inventor: Takuya Araki, Tokyo (JP)

(73) Assignee: NEC Corporation, Tokyo (JP)

( * ) Notice: Subject to any disclaimer, the term of this patent is extended or adjusted under 35 U.S.C. 154(b) by 229 days.

(21) Appl. No.: 14/130,229

(22) PCT Filed: May 28, 2012

(86) PCT No.: PCT/JP2012/003475
§ 371 (c)(1),
(2), (4) Date: Dec. 30, 2013

(87) PCT Pub. No.: WO2013/005370
PCT Pub. Date: Jan. 10, 2013

(65) Prior Publication Data
US 2014/0137127 A1    May 15, 2014

(30) Foreign Application Priority Data

Jul. 7, 2011    (JP) .................................. 2011-150619

(51) Int. Cl.
  *G06F 9/54*    (2006.01)
  *G06F 9/52*    (2006.01)
  *G06F 11/14*   (2006.01)

(52) U.S. Cl.
CPC ........ *G06F 9/544* (2013.01); *G06F 9/52* (2013.01); *G06F 11/1438* (2013.01); *G06F 11/1479* (2013.01)

(58) Field of Classification Search
CPC ...................................................... G06F 9/544
See application file for complete search history.

(56) References Cited

U.S. PATENT DOCUMENTS 5,343,480 A    8/1994  Hasegawa
7,221,677 B1 *  5/2007  Reed .................. H04L 45/30
                                           370/388

(Continued)

FOREIGN PATENT DOCUMENTS

CN    102144215    8/2011
EP    0408315      1/1991

(Continued)

OTHER PUBLICATIONS

International Search Report corresponding to PCT/JP2012/003475, dated Jul. 23, 2012, 5 pages.
Dean, J. et al., "MapReduce: Simplified Data Processing on Large Clusters", OSDI, 2004, 13 pages.

*Primary Examiner* — Emerson Puente
*Assistant Examiner* — Charlie Sun
(74) *Attorney, Agent, or Firm* — Wilmer Cutler Pickering Hale and Dorr LLP

(57) ABSTRACT

A distributed execution system includes an output-side pipe worker that operates on a node same as an output-side worker realized by a first distributed program, and an input-side pipe worker that operates on a node same as an input-side worker realized by a second distributed program, receives output data on the output-side worker from the output-side pipe worker, and transfers it to the input-side worker, in which the output-side pipe worker acquires, from the output-side worker, output data together with a sequence number indicating an order of the output data to be transmitted to the input-side worker, acquires a restore sequence number corresponding to an execution state of the input-side worker, compares the sequence number and the restore sequence number, and does not forward, to the input-side pipe worker, the output data acquired together with the sequence number indicating the order equal to or earlier than the restore sequence number.

6 Claims, 14 Drawing Sheets

(56) References Cited

U.S. PATENT DOCUMENTS

| | | | | |
|---|---|---|---|---|
| 8,789,013 | B1* | 7/2014 | Lloyd | G05B 11/011 717/106 |
| 2006/0277257 | A1* | 12/2006 | Kromann | H04L 12/583 709/206 |
| 2010/0057863 | A1 | 3/2010 | Allen et al. | |
| 2010/0179994 | A1* | 7/2010 | Bittles | G06Q 10/107 709/206 |
| 2013/0304886 | A1* | 11/2013 | Harpaz | H04L 67/1008 709/223 |

FOREIGN PATENT DOCUMENTS

| | | |
|---|---|---|
| JP | 63-143657 | 6/1988 |
| JP | 02-260055 | 10/1990 |
| JP | 03-041522 | 2/1991 |
| JP | 09-146782 | 6/1997 |
| JP | 11-237996 | 8/1999 |
| KR | 10-2011-0065448 | 6/2011 |
| WO | WO-2010/027610 | 3/2010 |

* cited by examiner

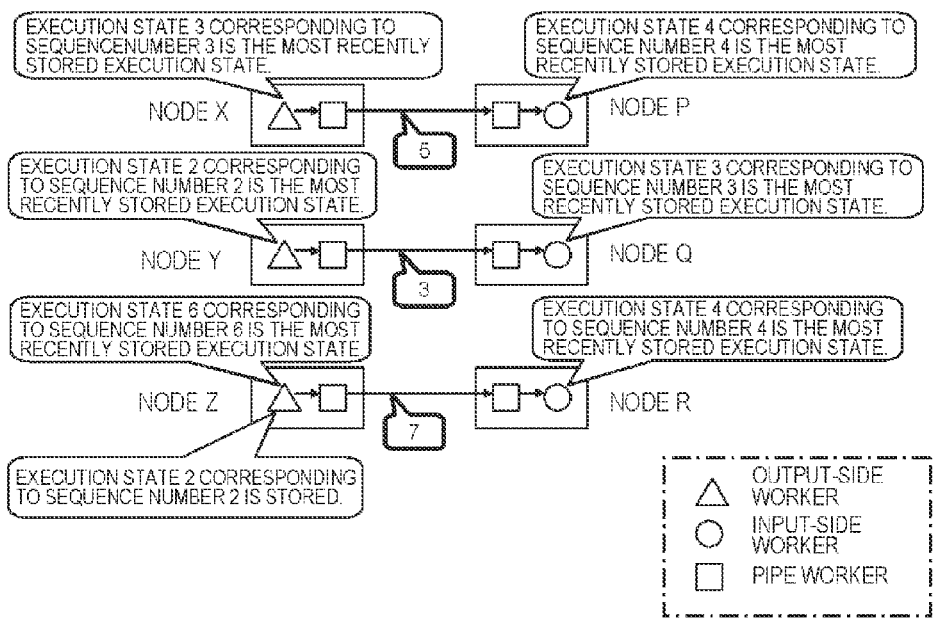

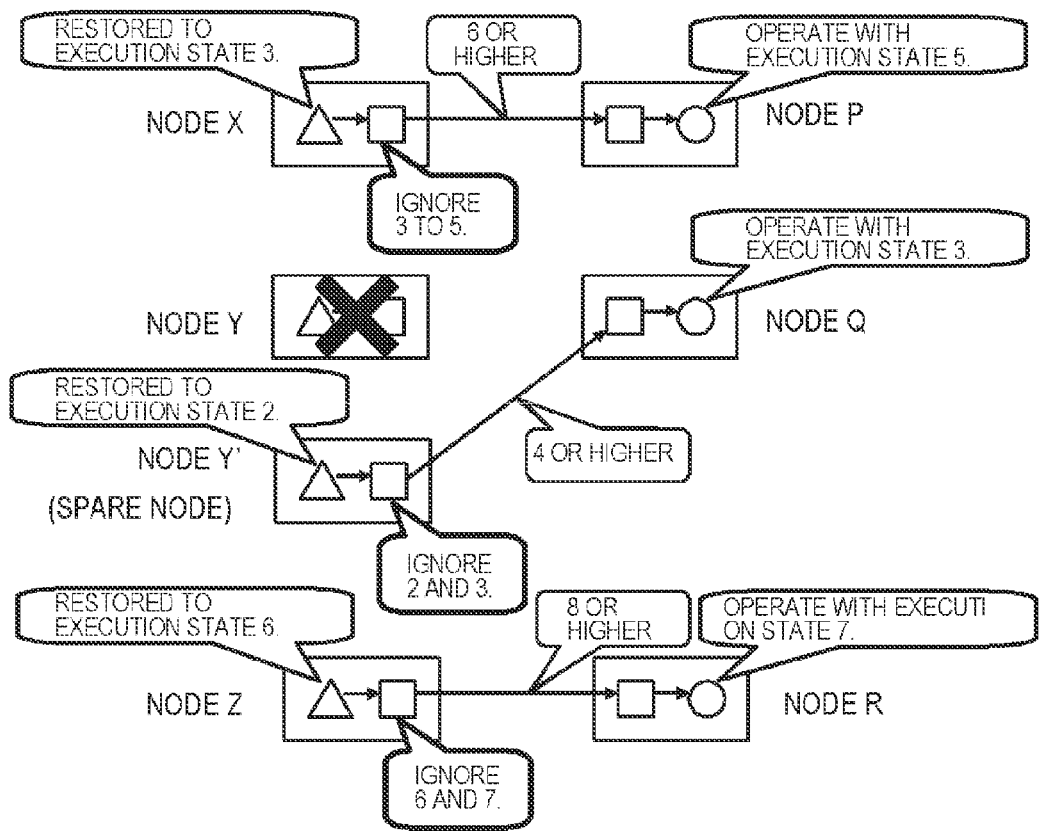

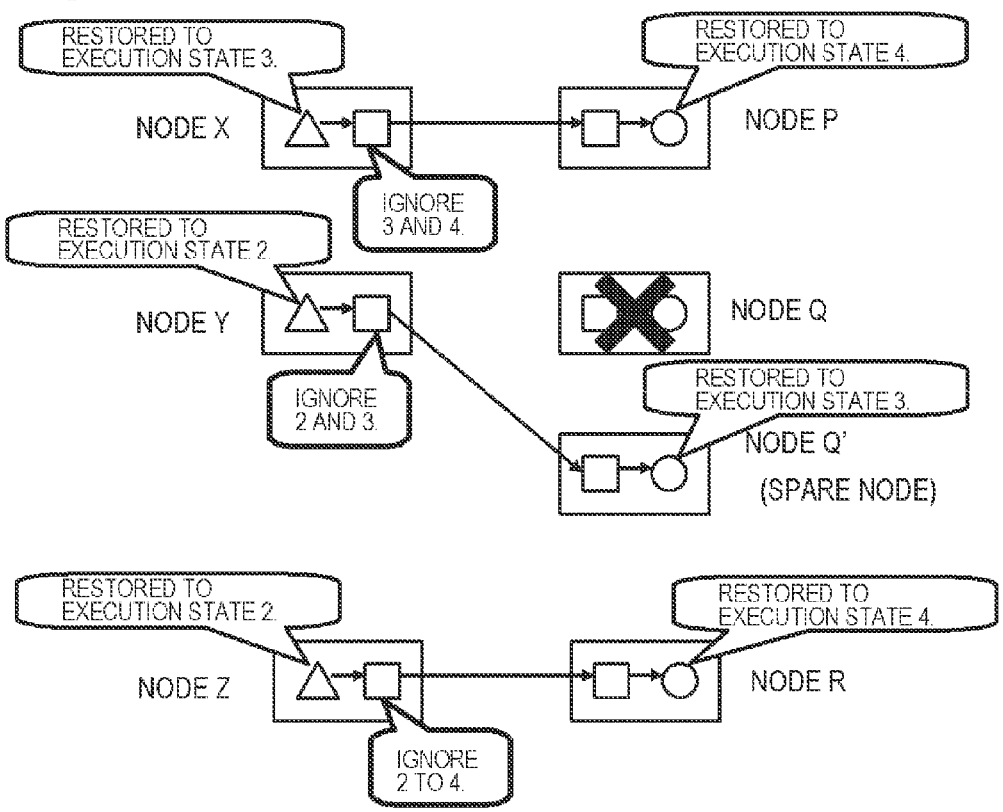

FIG. 9A
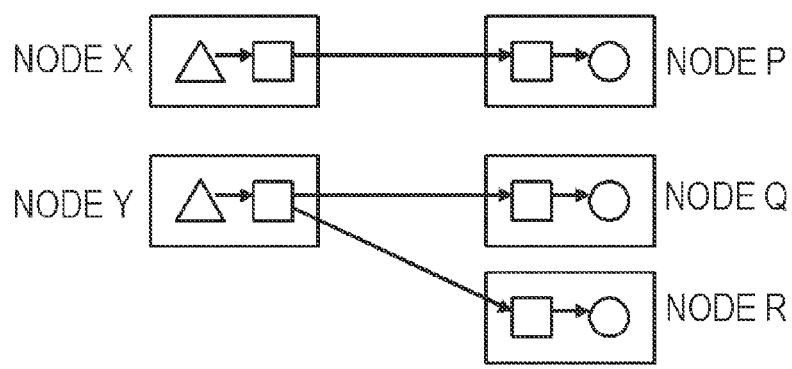
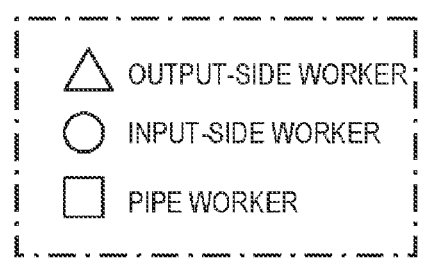
△ OUTPUT-SIDE WORKER
○ INPUT-SIDE WORKER
□ PIPE WORKER FIG. 9B
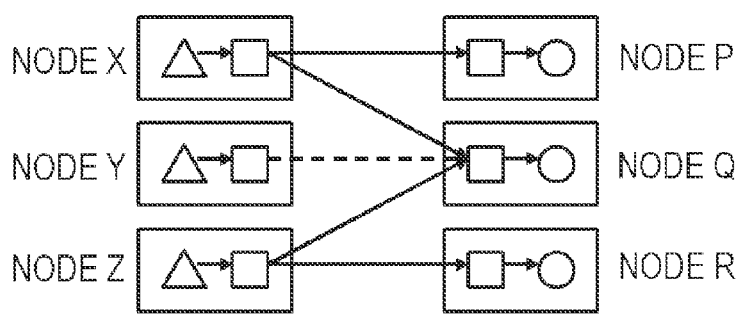
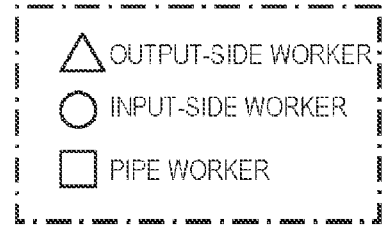

FIG. 10
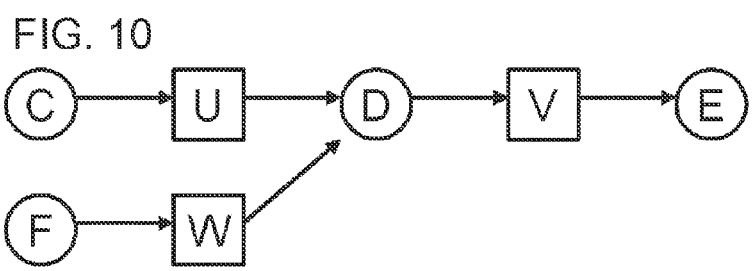
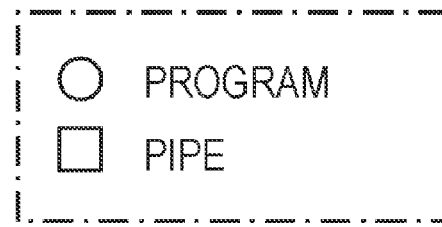

FIG. 12
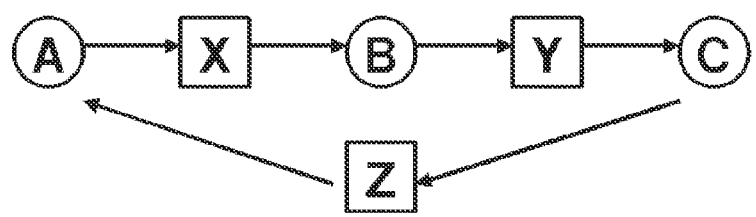

DISTRIBUTED EXECUTION SYSTEM AND DISTRIBUTED PROGRAM EXECUTION METHOD

CROSS-REFERENCE TO RELATED APPLICATIONS

This application is a national stage application of International Application No. PCT/JP2012/003475 entitled "Distributed Execution System and Distributed Program Execution Method," filed on May 28, 2012, which claims the benefit of the priority of Japanese Patent Application No. 2011-150619, filed on Jul. 7, 2011, the disclosures of each of which are hereby incorporated by reference in their entirety.

TECHNICAL FIELD

The present invention relates to a technique of executing plural distributed programs using a pipe.

BACKGROUND ART

In the case where plural distributed programs, which have been independently developed, are executed in combination, systems such as MapReduce described, for example, in Non-Patent Document 1 have been used to execute these distributed programs. In order to combine and execute plural programs written in MapReduce, it is necessary to use files for transmitting and receiving data between these programs. More specifically, the results of execution of one program are written out in a form of file, and through the file, the results of the execution of the program are inputted into another program.

However, using the file for transmitting and receiving the data between the programs causes a problem of efficiency. In general, the next program starts to be executed after the preceding program completely ends. However, it is possible to execute these programs in parallel by starting the next program to execute at a point in time when the preceding program is partially outputted.

In connection with sequential programs, a concept called "pipe" has been known. In the case where the pipe is used, the output from one program can be used as input of another program through a memory, whereby it is possible to start to execute the next program without waiting for the preceding program to completely end. For this reason, this pipe can be used for the distributed program, and it is possible to combine and execute plural distributed programs using this pipe.

On the other hand, in order to realize the distributed program, it is necessary to enhance reliability of the system. This is because, in the case where programs are executed on a large number of servers, the probability of failure to occur in one server is larger, as compared with the case where programs are sequentially executed on a single server.

MapReduce achieves improved reliability on the assumption that input and output between the programs are performed through highly reliable file systems. Thus, it cannot achieve the high reliability in the case where the pipe is used for input and output between the programs.

RELATED DOCUMENT

Non-Patent Document

Non-Patent Document 1: Jeffrey Dean and Sanjay Ghemawat, "MapReduce: Simplified Data Processing on Large Clusters", OSDI, pages 137-150, 2004

SUMMARY OF THE INVENTION

As described above, with the conventional techniques, the high reliability is difficult to be achieved in the system that employs the pipe to connect plural distributed programs that operate separately. It may be possible to, for example, employ a mode in which each of the programs separately stores an execution state, and the execution state of each of the programs is replaced with the previously stored execution state, thereby enhancing the reliability. However, with such a mode, in the case where execution states are stored at different times from program to program, the reliability cannot be enhanced because of occurrence of inconsistency between replaced execution states of respective programs.

The present invention has been made in view of the circumstances described above, and provides a technique that enhances reliability of a system that executes plural distributed programs connected to each other through a pipe.

In order to solve the problem described above, each mode of the present invention employs the following configuration.

A first aspect relates to a distributed execution system that executes a first distributed program and a second distributed program connected through a pipe. The distributed execution system according to the first aspect includes: an output-side pipe worker that operates on a node same as an output-side worker realized by the first distributed program; and an input-side pipe worker that operates on a node same as an input-side worker realized by the second distributed program, receives output data on the output-side worker from the output-side pipe worker, and transfers the output data to the input-side worker, in which the output-side pipe worker includes: a program connecting unit that acquires, from the output-side worker, output data together with a sequence number indicating an order of the output data to be transmitted to the input-side worker; an information acquiring unit that acquires a restore sequence number corresponding to an execution state of the input-side worker; and a first communication unit that compares the sequence number acquired by the program connecting unit and the restore sequence number acquired by the information acquiring unit, and does not forward, to the input-side pipe worker, the output data acquired together with the sequence number indicating the order equal to or earlier than the restore sequence number.

A second aspect relates to a distributed execution system that executes plural distributed programs connected to each other through a pipe. The distributed execution system according to the second aspect includes plural program workers that are realized by plural distributed programs, acquire output data from upstream program workers through the pipe, and transmit output data of the plural program workers themselves to downstream program workers, in which a leader program of the plural distributed programs stops an execution of a program worker realized by the leader program, and transmits an execution-state storing request to the upstream program worker and the downstream program worker; and each of the program workers that receives the execution-state storing request stops its own execution, forwards the execution-state storing request to another program worker connected through the pipe other than a transmission source of the execution-state storing request, notifies all the downstream program workers serving as the transmission source of the execution-state storing request, that the stop of the execution is completed, stores its own execution state after receiving the notification that the stop of the execution is completed from all the upstream program workers serving as a forwarding destination of the execution-state storing request, notifies the upstream program worker that the storing of the execution state is completed, and resumes its own execution after receiving the notification that the storing of the execution state is completed from all the downstream program workers.

A third aspect relates to a distributed program execution method. The distributed program execution method according to the third aspect is performed by plural computers, which includes: activating an output-side pipe worker that operates on a node same as an output-side worker realized by a first distributed program connected to a second distributed program through a pipe; and activating an input-side pipe worker that operates on a node same as an input-side worker realized by the second distributed program, receives output data on the output-side worker from the output-side pipe worker, and transfers this output data to the input-side worker, in which the output-side pipe worker: acquires, from the output-side worker, output data together with a sequence number indicating an order of the output data to be transmitted to the input-side worker; acquires a restore sequence number corresponding to an execution state of the input-side worker; compares the sequence number and the restore sequence number; and does not forward, to the input-side pipe worker, the output data acquired together with the sequence number indicating the order equal to or earlier than the restore sequence number.

A fourth aspect relates to a distributed program execution method. The distributed program execution method according to the fourth aspect is performed by plural computers, which includes activating plural program workers that are realized by plural distributed programs connected to each other through a pipe, acquire output data from upstream program workers through the pipe, and transmit output data of the plural program workers themselves to downstream program workers, in which a leader program of the plural distributed programs stops an execution of a program worker realized by the leader program, and transmits an execution-state storing request to the upstream program worker and the downstream program worker, and each of the program workers that receives the execution-state storing request: stops its own execution; forwards the execution-state storing request to another program worker connected through the pipe other than a transmission source of the execution-state storing request; notifies all the downstream program workers serving as the transmission source of the execution-state storing request, that the stop of the execution is completed; stores its own execution state after receiving the notification that the stop of the execution is completed, from all the upstream program workers serving as a forwarding destination of the execution-state storing request; notifies the upstream program worker that the storing of the execution state is completed; and resumes its own execution after receiving the notification that the storing of the execution state is completed from all the downstream program workers.

A fifth aspect relates to a distributed execution program. The distributed execution program according to the fifth aspect causes plural computers that execute a first distributed program and a second distributed program connected through a pipe, to realize: an output-side pipe worker that operates on a node same as an output-side worker realized by the first distributed program; and an input-side pipe worker that operates on a node same as an input-side worker realized by the second distributed program, receives output data on the output-side worker from the output-side pipe worker, and transfers the output data to the input-side worker, in which the output-side pipe worker includes: a program connecting unit that acquires, from the output-side worker, output data together with a sequence number indicating an order of the output data to be transmitted to the input-side worker; an information acquiring unit that acquires a restore sequence number corresponding to an execution state of the input-side worker; and a first communication unit that compares the sequence number acquired by the program connecting unit and the restore sequence number acquired by the information acquiring unit, and does not forward, to the input-side pipe worker, the output data acquired together with the sequence number indicating the order equal to or earlier than the restore sequence number.

A sixth aspect relates to a distributed execution program. The distributed execution program according to the sixth aspect causes plural computers executing plural distributed programs connected to each other through a pipe to realize plural program workers that are realized by the plural distributed programs, acquire output data from upstream program workers through the pipe, and transmit output data of the plural program workers themselves to downstream program workers, in which a leader program of the plural distributed programs stops an execution of a program worker realized by the leader program, and transmits an execution-state storing request to the upstream program worker and the downstream program worker, and each of the program workers that receives the execution-state storing request: stops its own execution; forwards the execution-state storing request to another program worker connected through the pipe other than a transmission source of the execution-state storing request; notifies all the downstream program workers serving as the transmission source of the execution-state storing request, that the stop of the execution is completed; stores its own execution state after receiving the notification that the stop of the execution is completed, from all the upstream program workers serving as a forwarding destination of the execution-state storing request; notifies the upstream program worker that the storing of the execution state is completed; and resumes its own execution after receiving the notification that the storing of the execution state is completed from all the downstream program workers.

It should be noted that another mode according to the present invention includes a computer-readable storage medium that stores the distributed execution program according to the five and six modes described above. This storage medium includes a non-transitory tangible medium.

According to each of the aspects described above, it is possible to provide a technique that improves reliability of a system that executes plural distributed programs connected to each other through a pipe.

BRIEF DESCRIPTION OF THE DRAWINGS

The above-described object and other objects of the present invention, and features and advantages of the present invention will be made further clear by the preferred embodiment described below and the following drawings attached thereto.

FIG. 6 is a schematic view illustrating an example of operations when a program is executed in the distributed execution system according to the first exemplary embodiment.

FIG. 7 is a schematic view illustrating an example of operations when failure occurs in an output-side distributed program in the distributed execution system according to the first exemplary embodiment.

FIG. 8 is a schematic view illustrating an example of operations when failure occurs in an input-side distributed program in the distributed execution system according to the first exemplary embodiment.

FIG. 9A is a schematic view illustrating a one-to-one connection mode and a one-to-multiple connection mode between an output-side pipe worker and an input-side pipe worker.

FIG. 9B is a schematic view illustrating a multiple-to-one connection mode between an output-side pipe worker and an input-side pipe worker.

FIG. 10 is a diagram logically illustrating an example of a mode in which plural programs are connected through pipes.

FIG. 12 is a diagram logically illustrating an example of a case where a loop is provided in the mode in which plural programs are connected through pipes.

DESCRIPTION OF EMBODIMENTS

Figure 1:
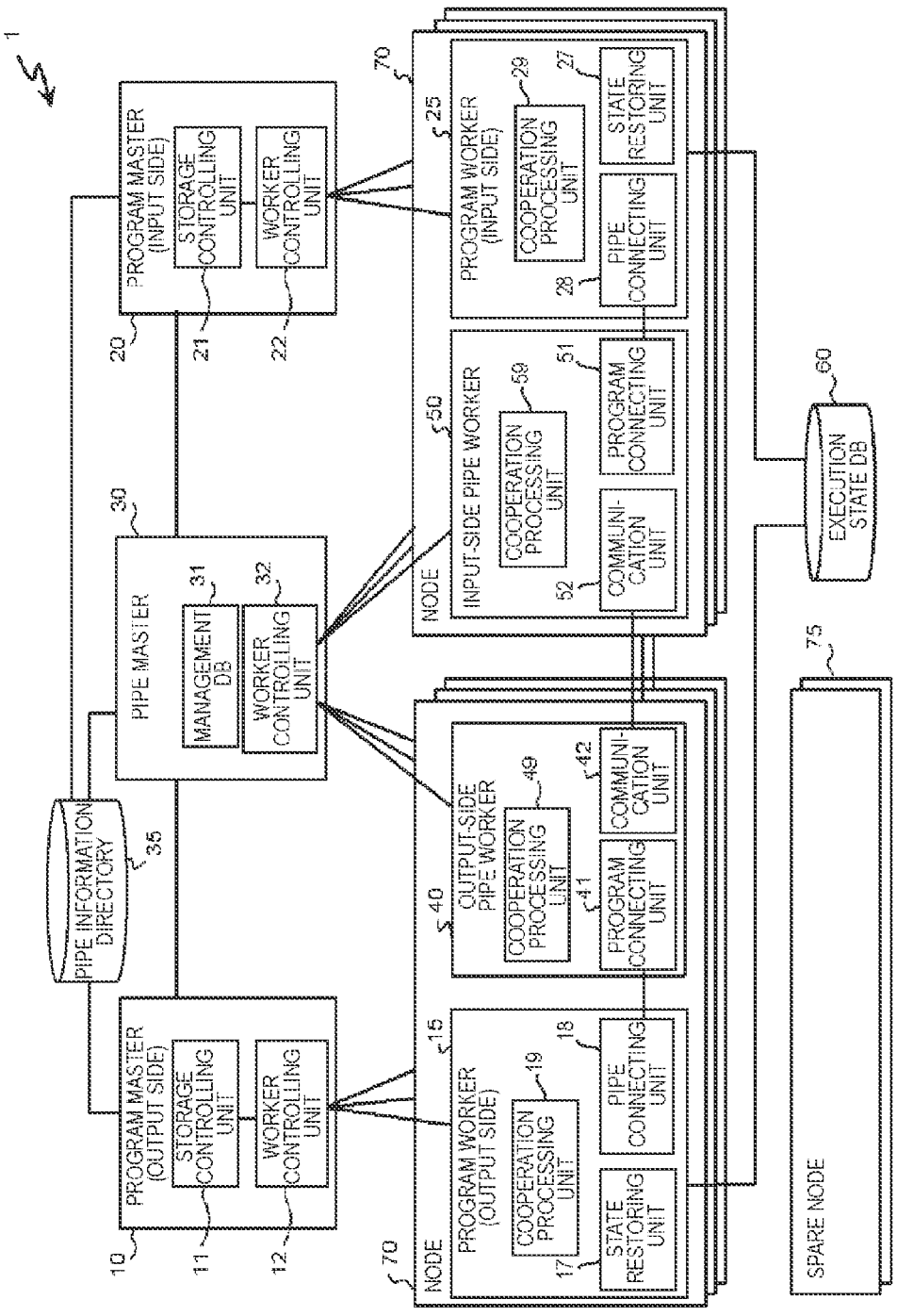
FIG. 1 is a schematic view illustrating an example of a configuration of a distributed execution system according to a first exemplary embodiment.

Below, exemplary embodiments according to the present invention will be described. Note that the exemplary embodiments described below are merely examples, and the present invention is not limited to the configurations of the exemplary embodiments below.

A distributed execution system according to this exemplary embodiment executes a first distributed program and a second distributed program that are connected to each other through a pipe. The first distributed program and the second distributed program may operate on different nodes, or may operate on the same single node.

The distributed execution system according to this exemplary embodiment includes an output-side pipe worker that operates on the node same as the node on which an output-side worker realized with a first distributed program operates, and an input-side pipe worker that operates on the node same as the node on which an input-side worker realized with a second distributed program operates. This input-side pipe worker receives output data on the output-side worker from the output-side pipe worker, and transmits the received output data to the input-side worker. Here, the output-side worker and the input-side worker are software configuration elements. The software configuration element represents a software component (element) such as a task, a process, and a thread realized by data (program) on a memory operating with a processor (for example, a central processing unit (CPU), and a digital signal processor (DSP)).

The output-side pipe worker includes a program connecting unit that acquires, from the output-side worker, the output data together with a sequence number indicating the order in which this output data is transferred to the input-side worker; an information acquiring unit that acquires a restore sequence number corresponding to an execution state of the input-side worker; and a first communication unit that compares the sequence number acquired by the program connecting unit with the restore sequence number acquired by the information acquiring unit, and does not transmit, to the input-side pipe worker, output data acquired together with the sequence number indicating the order equal to or earlier than the restore sequence number.

In this exemplary embodiment, the output data from the output-side worker realized by the first distributed program is inputted through the output-side pipe worker and the input-side pipe worker into the input-side worker realized by the second distributed program. At this time, the sequence number indicating the order of the output data being transmitted to the input-side worker is transmitted together with this output data from the output-side worker to the output-side pipe worker. The output-side pipe worker compares the sequence number transmitted from the output-side worker with the restore sequence number corresponding to the execution state of the input-side worker, and the output data acquired together with the sequence number indicating the order of output equal to or earlier than the restore sequence number is not transferred to the input-side pipe worker.

With these processes, in the case where the execution state of either of or both of the input-side worker and the output-side worker is restored to the previous state, a communication made between the output-side worker and the input-side worker before the state is restored is not made again. In other words, even if the execution state of either of or both of the input-side worker and the output-side worker is restored to the previous state, only the communication, which conforms to the execution states of both of the input-side worker and the output-side worker after the restoration, is made. Thus, according to this exemplary embodiment, even in the case where the distributed programs are restored to the execution states at different times, it is possible to prevent inconsistency in the execution states of the distributed programs after the restoration, and further, to improve reliability of the distributed execution system (program system) including plural distributed programs connected to each other through a pipe.

Below, the exemplary embodiment described above will be described in detail.

First Exemplary Embodiment

System Configuration

FIG. 1 is a schematic view illustrating an example of a configuration of a distributed execution system according to a first exemplary embodiment. The distributed execution system 1 according to the first exemplary embodiment executes a pipe program, and further executes a first distributed program and a second distributed program, which are connected to each other through a pipe realized by this pipe program.

The distributed execution system 1 includes plural nodes 70 (including a spare node 75) as a hardware configuration. Each of these nodes 70 may be called a computer. Each of the nodes 70 includes, for example, a central processing unit (CPU), a memory, and an input-output interface, and is an idea indicating a group of hardware elements for executing various programs stored in the memory. The node 70 may be a single computer device such as a personal computer, or may be a unit such as a CPU board, a plurality of which can be installed in a single hardware device. Each of the distributed programs and the pipe program is stored, for example, in a mobile storage medium such as a compact disc (CD) and a memory card, or a memory in a certain node 70 such as a hard disk and a read only memory (ROM).

In this specification, the number of distributed programs is two. However, this exemplary embodiment does not limit the number of distributed programs, provided that the distributed programs are connected to each other through a pipe in a manner that they can communicate with each other. Further, in this exemplary embodiment, an example is given in which the first distributed program and the second distributed program operate on different nodes 70.

The distributed execution system 1 according to the first exemplary embodiment includes, for example, an output-side program master 10, an output-side program worker 15, an input-side program master 20, an input-side program worker 25, a pipe master 30, an output-side pipe worker 40, an input-side pipe worker 50, a pipe information directory 35, and an execution state database 60, as software configuration elements. Hereinafter, the output-side program master 10 is referred to as an output-side master 10, the output-side program worker 15 is referred to as an output-side worker 15, the input-side program master 20 is referred to as an input-side master 20, the input-side program worker 25 is referred to as an input-side worker 25, and the execution state database 60 is referred to as an execution state DB 60.

Once the first distributed program is executed on a certain node 70, the distributed execution system 1 activates the output-side master 10 on a given node 70, and the output-side master 10 activates the output-side worker 15 on a designated node 70. Similarly, once the second distributed program is executed on a certain node 70, the distributed execution system 1 activates the input-side master 20 on a given node 70, and the input-side master 20 activates the input-side worker 25 on a designated node 70. For example, as illustrated in FIG. 1 as an example, plural output-side workers 15 and plural input-side workers 25 are activated on different nodes 70. Each of the output-side master 10 and the input-side master 20 may identify a node 70 on which the output-side worker 15 or the input-side worker 25 is activated, for example, by referring to a setting file. Further, this exemplary embodiment does not limit the number of the output-side workers 15 and the number of the input-side workers 25.

For the purpose of explanations, in the first exemplary embodiment, an example is given in which data outputted from the output-side worker 15 achieved by the first distributed program are acquired as an input by the input-side worker 25 achieved by the second distributed program. However, it may be possible to employ a mode in which data are exchanged with each other.

In the case where the pipe is used, the distributed execution system 1 executes a command for generating the pipe. In this command, a name of the pipe or other information is set. This command may be called from the first distributed program or the second distributed program. Upon execution of the command, the distributed execution system 1 activates the pipe master 30 on an appropriate node 70. The distributed execution system 1 further stores, in the pipe information directory 35, information for making a connection to the activated pipe master 30 so as to be associated with the name of this pipe. The information (connection information) for making a connection to the pipe master 30 includes, for example, an Internet Protocol (IP) address of the node 70 on which the pipe master 30 operates, and a port number from which the pipe master 30 receives the connection. Note that the pipe information directory 35 may be omitted if a mode in which the name of the pipe contains the connection information (for example, URL) is employed.

In the first distributed program and the second distributed program, a name of a pipe desired to be used and a usage mode of the pipe are set. For the usage mode of the pipe, whether the pipe is used for input or for output is set.

Each of the output-side master 10 and the input-side master 20 searches the pipe information directory 35 to acquire the connection information to the pipe master 30, and uses this connection information to make a connection to the pipe master 30. Here, "to make a connection" means to bring about a state where communication is possible. Further, each of the output-side master 10 and the input-side master 20 notifies the pipe master 30 of the usage mode of the pipe and the information on the mode 70 on which the worker is activated.

The pipe master 30 activates the output-side pipe worker 40 and the input-side pipe worker 50 on each of the nodes 70 on the basis of the information notified by each of the output-side master 10 and the input-side master 20. With these processes, the output-side pipe worker 40 operates on the node 70 same as the output-side worker 15 operates, and the input-side pipe worker 50 operates on the node same as the input-side worker 25 operates. The pipe master 30 notifies the output-side master 10 and the input-side master 20 of the information (connection information) for making a connection to each of the activated pipe workers. The information on connection to each of the pipe workers includes, for example, the port number in the case where a socket is used.

Each of the output-side worker 15 and the input-side worker 25 acquires the information on connection to each of the pipe workers notified by the output-side master 10 or the input-side master 20, and uses this information on connection to make a connection to the output-side pipe worker 40 or the input-side pipe worker 50. The output-side worker 15 transmits output data and a sequence number indicating the order of output of this output data, to the output-side pipe worker 40 to which connection has been made. The input-side worker 25 acquires this output data on the output-side worker 15 from the input-side worker 50 to which connection has been made. The output data communicated through the pipe is not a simple byte string, and is transmitted or received, for example, in a unit of a group (hereinafter, referred to as a record) having a meaning.

The output-side pipe worker 40 acquires, from the connected output-side worker 15, output data together with a sequence number indicating the order of output of this output data, and forwards the output data and the sequence number to the input-side pipe worker 50. The input-side pipe worker 50 receives the output data and the sequence number transmitted from the output-side pipe worker 40, and transfers these received data to the input-side worker 25.

The output-side pipe worker 40 retains the latest sequence number corresponding to the output data transmitted to the input-side pipe worker 50. The input-side pipe worker 50 retains the latest sequence number for each of the output-side pipe workers 40 serving as the transmission source on the basis of the sequence number transmitted from the output-side pipe worker 40. Note that each of the output-side pipe worker 40 and the input-side pipe worker 50 does not retain (buffer) the output data itself within the workers themselves. This is because, with this configuration, it is possible to eliminate the need to restore the execution state of the pipe itself at the time of occurrence of failure.

As for the software configuration elements, the output-side master 10 and the input-side master 20 have the same configuration as illustrated in FIG. 1. More specifically, the output-side master 10 includes a storage controlling unit 11, and a worker controlling unit 12, and the input-side master 20 includes a storage controlling unit 21, and a worker controlling unit 22. As for the software configuration elements, the pipe master 30 includes, for example, a management database (DB) 31, and a worker controlling unit 32.

The worker controlling units 12 and 22 perform the controlling processes as described above to the output-side worker 15 and the input-side worker 25, and perform the communication processes as described above to the pipe master 30. The worker controlling unit 32 in the pipe master 30 performs the controlling processes as described above to the output-side pipe worker 40 and the input-side pipe worker 50, and performs the communication processes as described above to the output-side master 10 and the input-side master 20.

The storage controlling units 11 and 21 perform, for example, processes related to storage and restoration of the execution states of the output-side worker 15 and the input-side worker 25.

The management DB 31 stores state identifying information (for example, execution state name) for identifying an execution state stored by the output-side worker 15 or the input-side worker 25, and individual sequence numbers retained in each of the output-side pipe workers 40 at the time of storing this execution state in a state where they are associated with each other. The management DB 31 corresponds to an association retaining unit.

As for the software configuration elements, the output-side worker 15 and the input-side worker 25 have the same configuration as illustrated in FIG. 1. More specifically, the output-side worker 15 includes a state restoring unit 17, a pipe connecting unit 18, and a cooperation processing unit 19, and the input-side worker 25 includes a state restoring unit 27, a pipe connecting unit 28, and a cooperation processing unit 29. Further, as for the software configuration elements, the output-side pipe worker 40 and the input-side pipe worker 50 have the same configuration as illustrated in FIG. 1. More specifically, the output-side pipe worker 40 includes a program connecting unit 41, a communication unit 42, and a cooperation processing unit 49, and the input-side pipe worker 50 includes a program connecting unit 51, a communication unit 52, and a cooperation processing unit 59.

The pipe connecting unit 18 and the program connecting unit 41 make a connection between the output-side worker 15 and the output-side pipe worker 40, and transmit and receive data therebetween. Similarly, the pipe connecting unit 28 and the program connecting unit 51 make a connection between the input-side worker 25 and the input-side pipe worker 50, and transmits and receives data therebetween. The communication units 42 and 52 make a communication between the output-side pipe worker 40 and the input-side pipe worker 50. The program connecting unit 41 or the communication unit 42 corresponds to a retaining unit of the output-side pipe worker 40. Further, the program connecting unit 51 or the communication unit 52 corresponds to a retaining unit of the input-side pipe worker 50.

The state restoring units 17 and 27 perform processes related to storage and restoration of an execution state of each of the output-side worker 15 and the input-side worker 25. The cooperation processing units 19 and 29 transmit or receive data between the output-side master 10 and the input-side master 20 and between the output-side worker 15 and the input-side worker 25. The cooperation processing units 49 and 59 transmit or receive data between the pipe master 30 and the output-side pipe worker 40 and between the pipe master 30 and the input-side pipe worker 50. The cooperation processing unit 49 corresponds to an information acquiring unit.

The execution state DB 60 stores each execution state related to the output-side worker 15 and the input-side worker 25 at a given point in time. More specifically, the execution state DB 60 stores restore data at each point in time used for restoring each of the output-side worker 15 and the input-side worker 25 to an execution state at a certain point in time. Note that this exemplary embodiment does not limit a storage mode of the execution state. The data stored in the execution state DB 60 may be any data with which the output-side worker 15 and the input-side worker 25 can be restored at the time of occurrence of failure, to an execution state at a given time when they operate normally.

Example of Operation

Below, an example of operations performed by the distributed execution system 1 according to the first exemplary embodiment will be described for each situation with reference to FIG. 2 to FIG. 5. FIG. 2 to FIG. 5 each illustrate a pipe program and distributed programs performed on the distributed execution system 1.

Figure 2:
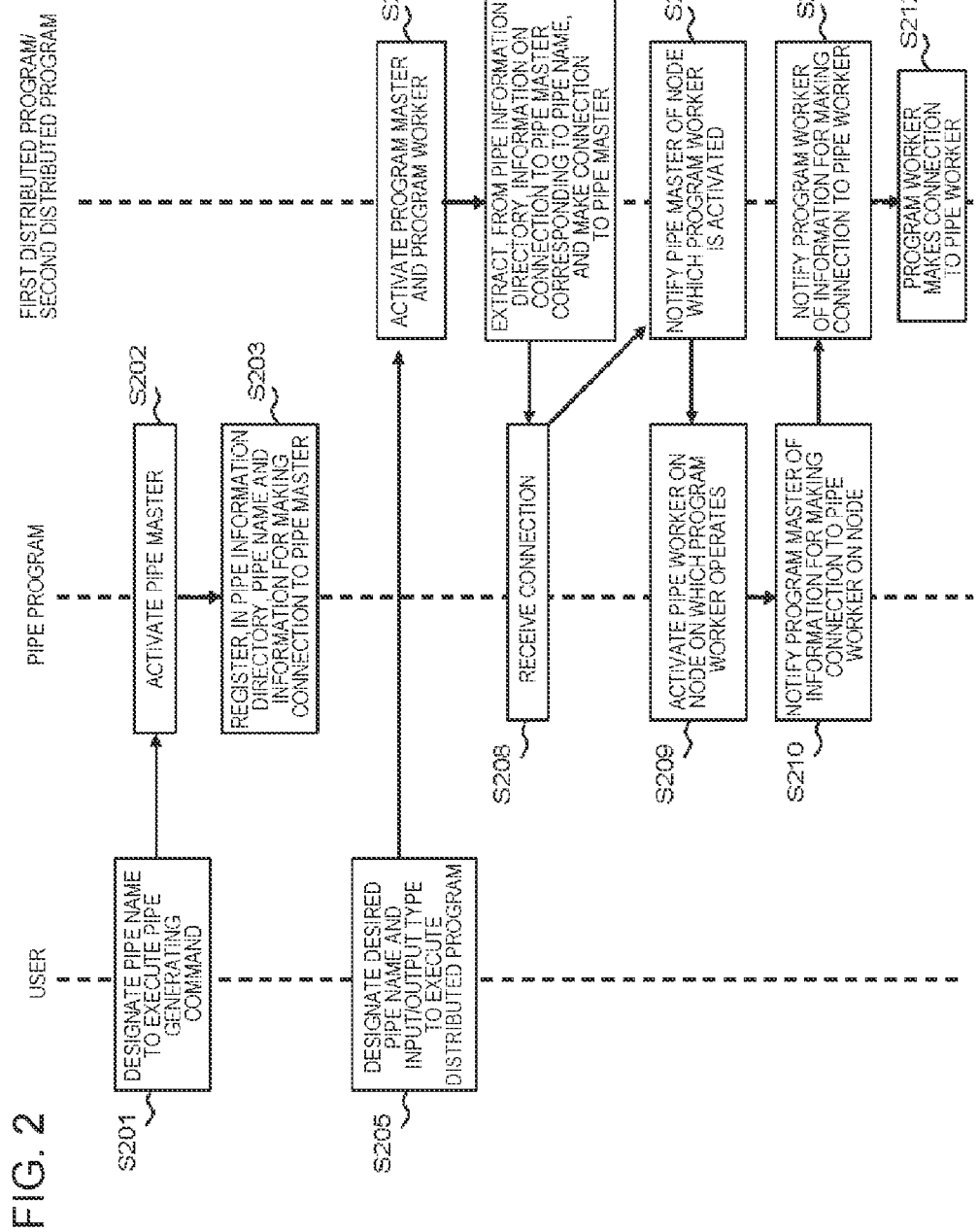
FIG. 2 is a sequence diagram illustrating an example of operations when a program is activated in the distributed execution system according to the first exemplary embodiment.

FIG. 2 is a sequence diagram illustrating an example of operations when programs are activated in the distributed execution system 1 according to the first exemplary embodiment. As illustrated in FIG. 2, a user executes a pipe generating command in the distributed execution system 1 (S201). In this pipe generating command, a pipe name or other information is designated. Here, the performer of the execution of the pipe generating command is a user. However, it may be possible for a distributed program or other programs to execute the pipe generating command therewithin.

With the execution of the pipe generating command, the distributed execution system 1 activates the pipe master 30 (S202). Then, the distributed execution system 1 registers information for making a connection with the activated pipe master 30 in the pipe information directory 35 in a manner such that the information is associated with a name of a pipe (S203).

Next, in the distributed execution system 1, the user designates the name of a pipe that the user desires to use, and selects input-side or output-side to execute the distributed program (S205). With these operations, the first distributed program and the second distributed program are executed as illustrated in FIG. 2 to FIG. 5.

The distributed execution system 1 activates, on an appropriate node 70, a program master according to the designated type (S206). In the example illustrated in FIG. 1, the output-side master 10 is activated in response to the designation of the output type, and the input-side master 20 is activated in response to the designation of the input type. Then, the activated program master activates a program worker on a given node 70 (S206). In the example illustrated in FIG. 1, the output-side master 10 activates the output-side worker 15 on plural nodes 70, and the input-side master 20 activates the input-side worker 25 on plural nodes 70.

The program master uses a designated pipe name to extract, from the pipe information directory 35, information on connection to the pipe master 30. The program master uses the extracted connection information to make a connection to the pipe master 30 (S207). The pipe master 30 receives the connection from the program master (S208). Note that the connection between the pipe master 30 and the program master is realized, for example, by a generally known sequence for realizing a communication between processes. As a result, the output-side master 10 and the input-side master 20 are connected to the pipe master 30.

Upon succeeding in connecting with the pipe master 30, each of the program masters notifies the pipe master 30 of information on the node 70 on which the program worker is activated (S208). More specifically, the output-side master 10 notifies the pipe master 30 of the information on each of the nodes 70 on which each of the output-side workers 15 is activated, and the input-side master 20 notifies the pipe master 30 of the information on each of the nodes 70 on which each of the input-side workers 25 is activated.

In response to the notification from each of the program masters, the pipe master 30 activates a pipe worker on the node 70 on which each program worker operates, in accordance with the designated type (input or output) (S209). More specifically, the pipe master 30 activates each output-side pipe worker 40 on the node 70 on which each output-side worker 15 operates, and activates each input-side pipe worker 50 on the node 70 on which each input-side worker 25 operates.

The pipe master 30 notifies each the program masters of information for making a connection to each of the activated pipe workers (S210). With these processes, the output-side master 10 acquires information for making a connection to each of the output-side pipe workers 40, and the input-side master 20 acquires information for making a connection to each of the input-side pipe workers 50.

Each of the program masters notifies each of the program workers of information for making a connection to each of the pipe workers (S211). Each of the program workers makes a connection to the pipe worker using the notified connection information (S212). As a result, the output-side worker 15 is connected to the output-side pipe worker 40, and the input-side worker 25 is connected to the input-side pipe worker 50.

Figure 3:
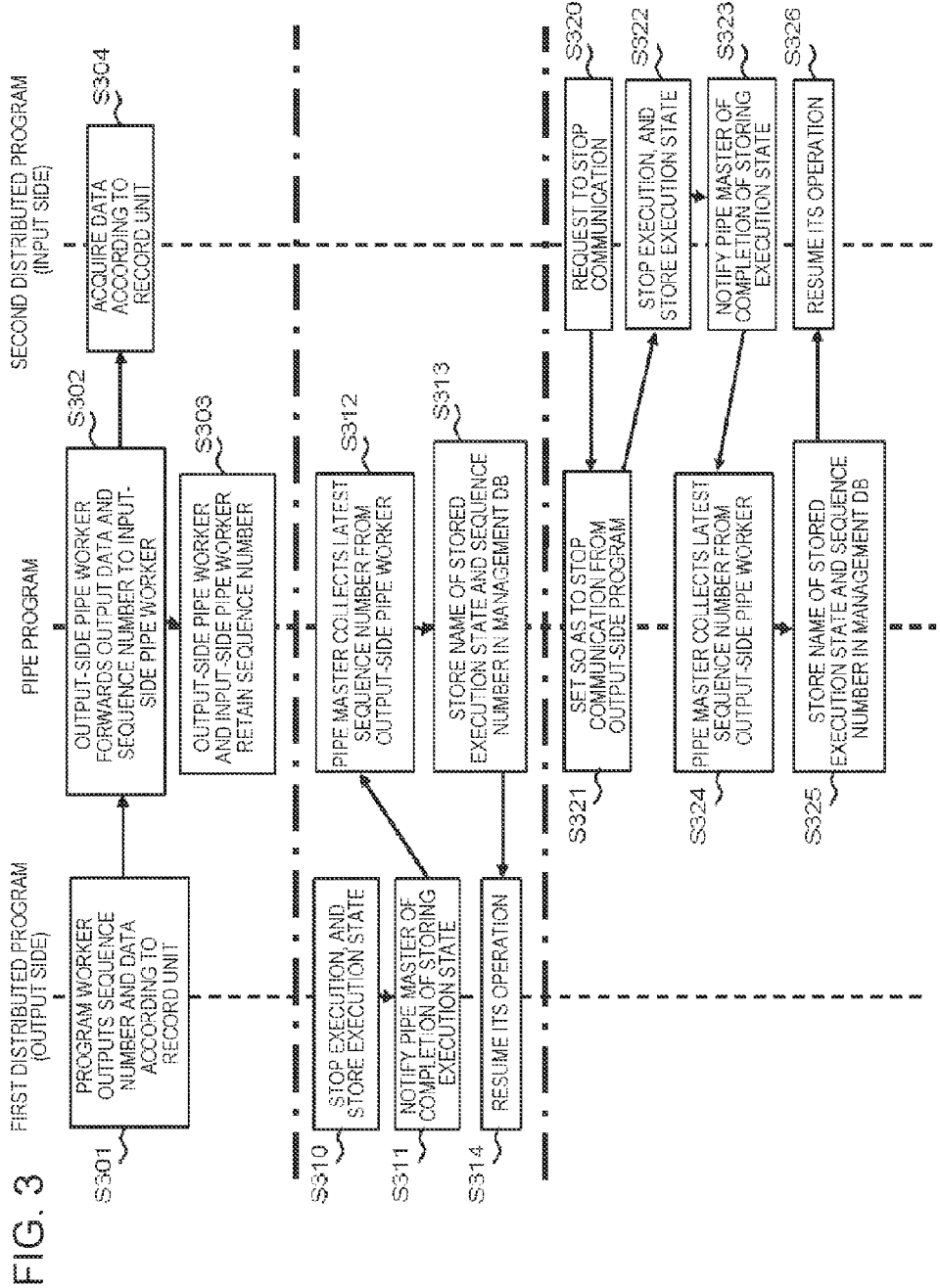
FIG. 3 is a sequence diagram illustrating an example of operations when a program is executed in the distributed execution system according to the first exemplary embodiment.

FIG. 3 is a sequence diagram illustrating an example of an operation when programs are executed in the distributed execution system 1 according to the first exemplary embodiment. In the case where a communication is made between program workers using a pipe, the processes from S301 to S304 shown in FIG. 3 are performed.

The output-side worker 15 attaches, to output data to be transferred to the output-side pipe worker 40, a number (sequence number) indicating the order of the output data being transferred to the input-side worker 25. The output-side worker 15 transfers the output data and the sequence number related to this output data to the connected output-side pipe worker 40 (S301).

The output-side pipe worker 40 forwards the output data and the sequence number thereof, which are received from the output-side worker 15, to the input-side pipe worker 50 (S302).

The input-side pipe worker 50 receives the output data and the sequence number from the output-side pipe worker 40, and transfers this output data to the input-side worker 25 (S302). At this time, the output-side pipe worker 40 and the input-side pipe worker 50 retains the latest sequence number of all the sequence number exchanged (S303).

The input-side worker 25 acquires the output data from the output-side worker 15 according to a record unit (S304).

Each of the program workers stores the execution state thereof in the execution state DB 60 at given times. In the case where the execution state of the output-side worker 15 is stored, the processes from S310 to S314 shown in FIG. 3 are performed.

The storage controlling unit 11 of the output-side master 10 gives an instruction for each of the output-side workers 15 to store the execution state at a given time. The "given time" means, for example, a predetermined cycle. In each of the output-side workers 15, once the cooperation processing unit 19 receives the instruction from the output-side master 10, the state restoring unit 17 stops its operation (operation of the output-side worker 15 itself), and stores, in the execution state DB 60, the execution state at this point in time, together with state identifying information with which this execution state can be identified (S310). The state identifying information may be a name (character string) indicating the execution state, or may be an identification number (ID).

Upon receiving the notification of completion of storing the execution state, from each of the output-side workers 15, the storage controlling unit 11 of the output-side master 10 notifies the pipe master 30 of completion of storing the execution state together with each of the state identifying information (S311).

It should be noted that, here, an example in which the output-side master 10 gives an instruction for each of the output-side workers 15 to store the execution state was given. However, it may be possible for each of the output-side workers 15 to independently start storing the execution state at a given time.

Upon receiving the notification of completion of storing the execution state from the output-side master 10, the pipe master 30 collects the latest sequence number at that time from each of the output-side pipe workers 40 (S312). The pipe master 30 stores, in the management DB 31, the state identifying information for identifying the execution state stored by each of the output-side workers 15 and each of the collected sequence numbers in a manner such that the state identifying information and each of the collected sequence number are associated with information on the corresponding output-side pipe worker 40 (S313). The pipe master 30 notifies the output-side master 10 of completion of the process S313.

Once the output-side master 10 receives the notification of completion of the process from the pipe master 30, the storage controlling unit 11 gives an instruction for each of the output-side workers 15 to resume its operation. With this operation, each of the output-side workers 15 starts its operation again (S314).

On the other hand, in the case where the execution state of the input-side worker 25 is stored, the processes from S320 to S326 shown in FIG. 3 are performed. In this case, the storage controlling unit 21 of the input-side master 20 requests the pipe master 30 at a given time to stop communication (S320). The "given time" means a time at which the execution state of the input-side worker 25 is stored, and means, for example, a predetermined cycle.

Upon receiving the request to stop communication, the pipe master 30 gives an instruction for each of the output-side pipe workers 40 to stop transmission of the output data from each of the output-side workers 15 (S321). With this process, the output data and the sequence number are not transmitted from the output-side worker 15 to the output-side pipe worker 40.

Once the input-side master 20 receives, from the pipe master 30, the notification of completion of instruction of stopping transmission, the storage controlling unit 21 gives an instruction for each of the input-side workers 25 to store the execution state. In each of the input-side workers 25, once the cooperation processing unit 29 receives the instruction from the input-side master 20, the state restoring unit 27 stops its own process (process of the input-side worker 25 itself), and stores, in the execution state DB 60, the execution state at this point in time together with the state identifying information with which this execution state can be identified (S322).

Upon receiving, from each of the input-side workers 25, the notification of completion of storing the execution state, the storage controlling unit 21 of the input-side master 20 notifies the pipe master 30 of the completion of storing the execution state together with each of the state identifying information (S323).

Upon receiving the notification of completion of storing the execution state from the input-side master 20, the pipe master 30 collects the latest sequence number at this time from each of the output-side pipe workers 40 (S324). The pipe master 30 stores, in the management DB 31, the state identifying information for identifying the execution state stored by each of the input-side workers 25 and each of the collected sequence numbers in a manner such that the state identifying information and the collected sequence number are associated with information on the corresponding output-side pipe worker 40 (S325). The pipe master 30 notifies the input-side master 20 of completion of the process S325.

Once the input-side master 20 receives the notification of completion of the process from the pipe master 30, the storage controlling unit 21 gives an instruction for each of the input-side workers 25 to resume its operation. With this instruction, each of the input-side workers 25 starts its operation again (S326).

Figure 4:
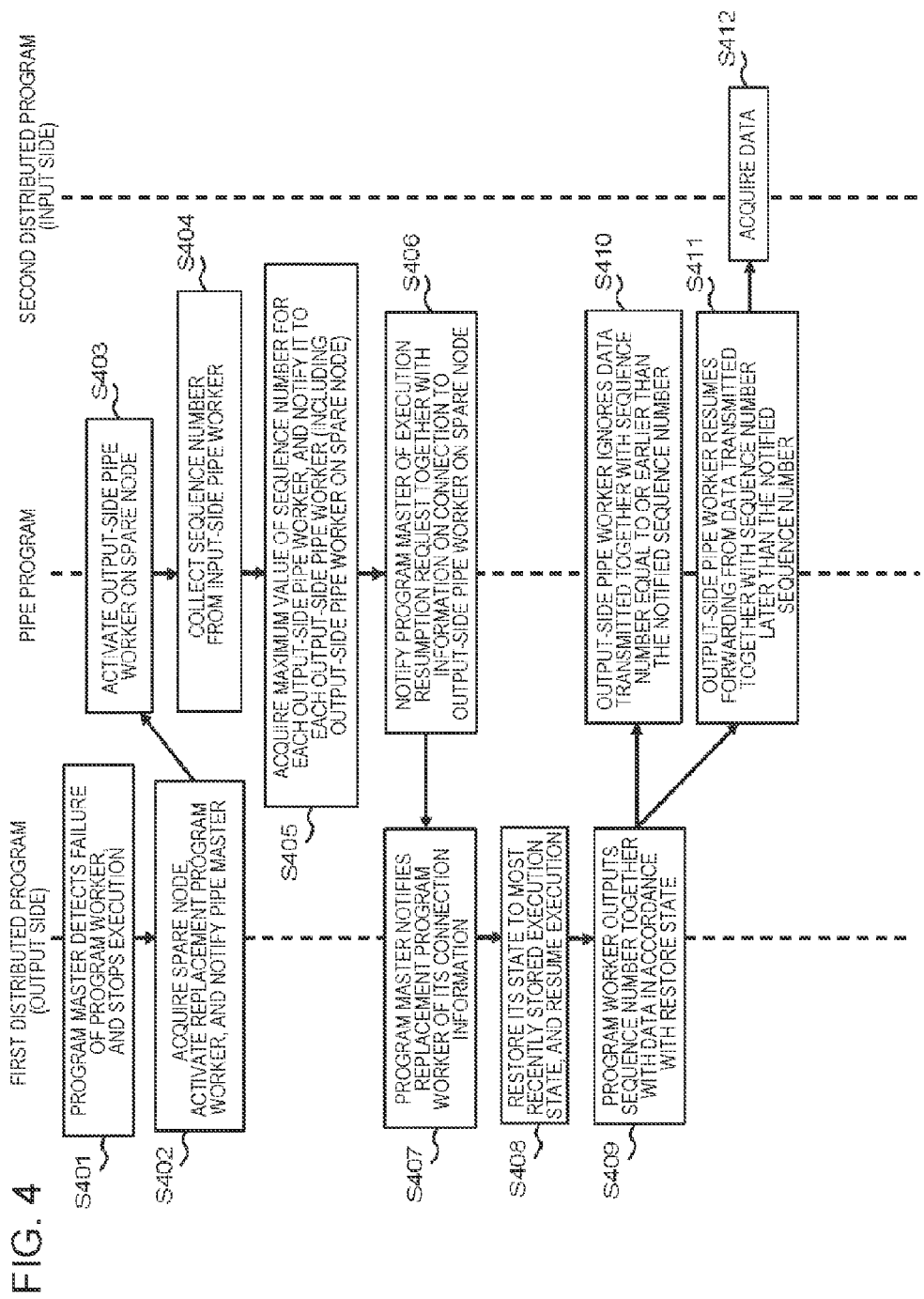
FIG. 4 is a sequence diagram illustrating an example of operations when failure occurs in an output-side distributed program in the distributed execution system according to the first exemplary embodiment.

FIG. 4 is a sequence diagram illustrating an example of operations when failure occurs in the output-side distributed program in the distributed execution system 1 according to the first exemplary embodiment.

At the time of occurrence of failure, the output-side master 10 (worker controlling unit 12) detects an output-side worker 15 in which failure occurs (S401). For example, the worker controlling unit 12 always monitors each of the output-side workers 15. Note that the detection of failure made by the output-side master 10 may be achieved by notification from the output-side worker 15. The failure of the output-side worker 15 occurs, for example, due to hardware failure of the node 70 on which this output-side worker 15 operates. It may be possible to use known methods to detect the failure. Upon detecting failure in at least one output-side worker 15, the worker controlling unit 12 of the output-side master 10 stops all the output-side workers 15 operating (S401). Hereinafter, the output-side worker 15 in which failure occurs is referred to as a failure worker.

The output-side master 10 identifies a spare node 75 from among all the nodes 70 as a replacement for the node 70 on which the failure worker operates (S402). The output-side master 10 (worker controlling unit 12) newly activates, on the spare node 75, an output-side worker 15 serving as a replacement for the failure worker (output-side worker 15) (S402). Hereinafter, the output-side worker 15 that is newly activated on this spare node 75 is referred to as a replacement worker. The output-side master 10 notifies the pipe master 30 of occurrence of failure and information on the spare node 75 (S402).

The pipe master 30 newly activates the output-side pipe worker 40 on the spare node 75 on the basis of the notification from the output-side master 10 (S403).

Then, the pipe master 30 collects the latest sequence number retained from each of the input-side pipe workers 50 (S404). At this time, in relation to each of the latest sequence numbers, the pipe master 30 may collect information on the output-side pipe worker 40 serving as the transmission source. The pipe master 30 acquires the maximum value of the sequence number for each of the output-side pipe worker 40 on the basis of the sequence numbers collected from each of the input-side pipe workers 50, and notifies each of the output-side pipe workers 40 of the acquired maximum value as the restore sequence number (S405). The output-side pipe worker 40 serving as the target of notification includes the output-side pipe worker 40 that is newly activated on the spare node 75.

The pipe master 30 notifies the output-side master 10 of information for making a connection to the output-side pipe worker 40 that is newly activated on the spare node 75, and of a request to resume its operation (S406).

The output-side master 10 (worker controlling unit 12) notifies the replacement worker of information for making a connection to the output-side pipe worker 40 that is newly activated on the space node 75 on the basis of the notification from the pipe master 30 (S407). Then, the output-side master 10 (storage controlling unit 11) gives an instruction for each of the output-side workers 15 (including the replacement worker) that has been stopped, to carry out restoration of the execution state and resume execution.

In response to the instruction from the output-side master 10, in each of the output-side workers 15, the state restoring unit 17 uses the data stored in the execution state DB 60 to restore the execution state of this output-side worker 15 to the most recently stored state, and resumes the execution of this output-side worker 15 (S408). At this time, the execution state stored in relation to the output-side worker 15 in which failure occurs is set to the replacement worker, and the replacement worker starts its operation.

With these processes, each of the output-side workers 15 including the replacement worker transmits the sequence number corresponding to the restored state, and the output data to the output-side pipe worker 40 (S409). At this time, with the restoration of the execution state, the sequence number attached to each of the output-side workers 15 is also brought back to the restored state.

Each of the output-side pipe workers 40 ignores the output data transmitted together with the sequence number equal to or earlier than the restore sequence number notified from the pipe master 30 in the process S405 (S410). Each of the output-side pipe workers 40 forwards, to the input-side pipe worker 50, the output data transmitted together with the sequence number later than this restore sequence number (S411).

With this process, the output data having the sequence number equal to or earlier than the restore sequence number is not transmitted to the input-side worker 25, and output data are transmitted to the input-side worker 25 starting from the output data having the sequence number later than this restore sequence number (S412).

At this state, before failure occurs in the output-side worker 15, the output data corresponding to this restore sequence number is transmitted from the output-side worker 15 to the input-side worker 25. This restore sequence number is retained in the input-side pipe worker 50, and hence, corresponds to the latest output data that has been already transmitted from the output-side pipe worker 40 to the input-side pipe worker 50. Therefore, with the operations as described above, the communication that has already been made between the output-side worker 15 and the input-side worker 25 before restoration of the state is not made again.

On the other hand, each of the input-side workers 25 in which failure does not occur has an execution state after the latest output data is received. As described above, the output-side pipe worker 40 ignores the output data equal to or earlier than the latest output data, and hence, only the communication that is consistent with the execution state is made between the first distributed program in which failure occurs and the normal second distributed program. Thus, inconsistencies do not occur in the execution states of the distributed programs after recovery from the failure.

Figure 5:
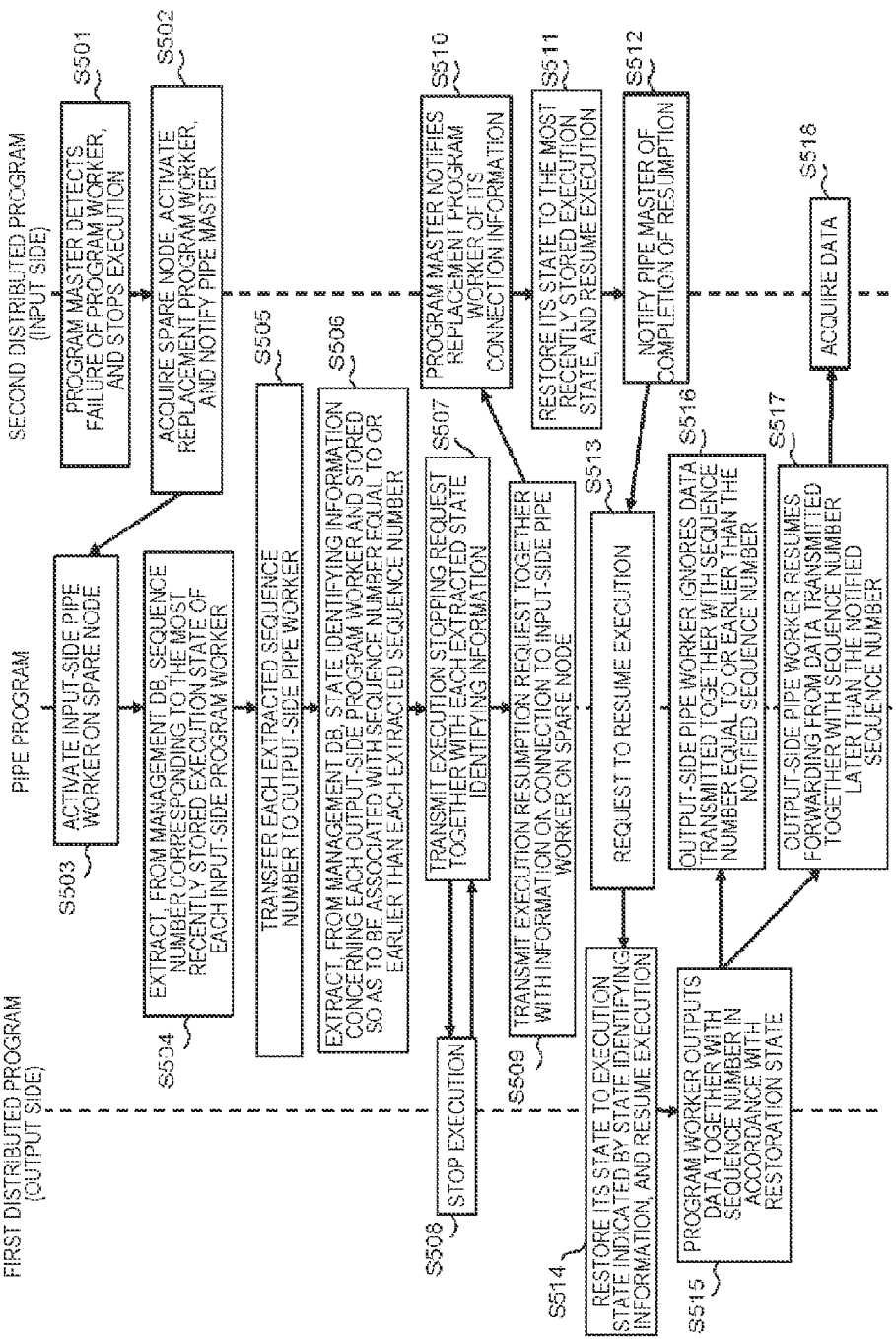
FIG. 5 is a sequence diagram illustrating an example of operations when failure occurs in an input-side distributed program in the distributed execution system according to the first exemplary embodiment.

FIG. 5 is a sequence diagram illustrating an example of operation when failure occurs in an input-side distributed program in the distributed execution system 1 according to the first exemplary embodiment.

The processes from S501 to S503 are almost the same as those from S401 to S403 shown in FIG. 4 except for the portion (input side or output side) where failure occurs, and hence, explanation of those processes will not be repeated.

The pipe master 30 newly activates an input-side pipe worker 50 on the spare node 75 (S503), and then, extracts, from the management DB 31, the sequence number stored so as to be associated with the most recently stored execution state of each of the input-side workers 25 (S504). The pipe master 30 transmits the extracted sequence numbers to the corresponding output-side pipe workers 40 as the restore sequence numbers (S505).

Further, the pipe master 30 extracts, from the management DB 31, state identifying information concerning each of the output-side workers 15 and stored so as to be associated with the sequence number equal to or earlier than the extracted sequence numbers (S506).

The pipe master 30 notifies the output-side master 10 of the extracted state identifying information and a request to stop an execution (S507). With this notification, the output-side master 10 (worker controlling unit 12) stops each of the output-side workers 15 executing, and returns its completion to the pipe master 30 (S508).

Once it is checked that each of the output-side workers 15 stops, the pipe master 30 transmits, to the input-side master 20, information on connection to the input-side pipe worker 50 that is newly activated on the spare node 75, and a request to resume its execution (S509).

The process S510 and the process S511 are almost the same as the process S407 and the process S408 shown in FIG. 4 except for the parts (input side or output side) where failure occurs, and hence, explanation of them will not be repeated. Upon completion of resumption of each of the input-side workers 25, the input-side master 20 notifies the pipe master 30 to that effect (S512).

Once resumption of each of the input-side workers 25 is checked on the basis of the notification from the input-side master 20, the pipe master 30 transmits a request to resume its execution to the output-side master 10 (S513).

In response to the notification from the pipe master 30, the output-side master 10 gives an instruction for each of the output-side workers 15, which stopped its operation, to restore its state to the execution state indicated by each of the state identifying information, and resume its execution. With this instruction, in each of the output-side workers 15, the state restoring unit 17 uses the data stored in the execution state DB 60 to restore the execution state of this output-side worker 15 to the execution state identified on the basis of this state identifying information, and resumes the operations of this output-side worker 15 (S514).

After this, the processes from S515 to S518 are the same as those from S409 to S412 shown in FIG. 4, and hence, explanation thereof will not be repeated.

As described above, in the case where failure occurs in the input-side distributed program, each of the input-side workers 25 including the replacement worker restores its state to the most recently stored execution state (S511); each of the output-side workers 15 is brought back to the execution state at the point in time or prior to the stage when each of the input-side workers 25 is restored (S506, S514); and the sequence number (restore sequence number) corresponding to the execution state of the input-side worker 25 is set to each of the output-side pipe workers 40 (S505). As a result, in a similar manner to the case where failure occurs in the output-side worker 15, even if failure occurs in the input-side worker 25 realized by the second distributed program, operations are resumed from a communication according to the execution state after the restoration, and inconsistence does not occur in the execution states of the distributed programs after restoration from the failure.

Operations of the above-described distributed execution system 1 according to the first exemplary embodiment will be described with reference to FIG. 6 to FIG. 8. FIG. 6 to FIG. 8 show, as an example, that the output-side worker 15 and the output-side pipe worker 40 operate on each of a node X, a node Y, and anode Z, and the input-side worker 25 and the input-side pipe worker 50 operate on each of a node P, a node Q, and a node R. Here, the output-side worker, the output-side pipe worker, the input-side worker, and the input-side pipe worker are described by using the reference characters representing the nodes on which they are operating. For example, the output-side worker 15 and the output-side pipe worker 40 operating on the node X are denoted as an output-side worker X and an output-side pipe worker X, respectively.

FIG. 6 is a schematic view illustrating an example of operations when programs are executed in the distributed execution system 1 according to the first exemplary embodiment. It is assumed that, as illustrated in FIG. 6, the sequence number 5 and the corresponding output data have already been transmitted from the output-side worker X to the input-side worker P, the sequence number 3 and the corresponding output data have already been transmitted from the output-side worker Y to the input-side worker Q, and the sequence number 7 and the corresponding output data have already been transmitted from the output-side worker Z to the input-side worker R. Further, it is also assumed that the execution state of each of the program workers illustrated in FIG. 6 is stored in the execution state DB 60.

FIG. 7 is a schematic view illustrating an example of operations when failure occurs in the output-side distributed program in the distributed execution system 1 according to the first exemplary embodiment. In the state illustrated in FIG. 6, in the case where failure occurs on the output-side node Y, the executions of the output-side workers X, Y, and Z are stopped after the failure in the output-side worker Y is detected. Further, a spare node Y' is secured as a replacement for the node Y, and an output-side worker Y' and an output-side pipe worker Y' are newly activated on the spare node Y'. Then, the output-side pipe worker X is notified of the latest sequence number 5 retained in the input-side pipe worker 50 as the restore sequence number. Similarly, the output-side pipe worker Y' is notified of the latest sequence number 3 as the restore sequence number, and the output-side pipe worker Z is notified of the latest sequence number 7 as the restore sequence number.

Then, the output-side worker X is restored to the most recently stored execution state 3, and the output-side worker Z is restored to the most recently stored execution state 6. The output-side worker Y' activated on the spare node Y' is restored to the most recently stored execution state 2 in the output-side worker Y. At this time, the input-side workers P, Q, and R operate with the execution states at the point in time when or after receiving the data corresponding to the sequence numbers 5, 3, and 7.

With resumption of executions, the output-side workers X, Y' and Z try to start communication corresponding the sequence numbers 3, 2, and 6 in accordance with the restored execution states. On the other hand, the output-side pipe workers X, Y' and Z ignore communication corresponding to the sequence number equal to or earlier than the notified restore sequence number. More specifically, the output-side pipe worker X ignores the output data transmitted together with the sequence numbers 3 and 5, which are equal to or earlier than the sequence number 5. The output-side pipe worker Y' ignores the output data transmitted together with the sequence numbers 2 and 3, which are equal to or earlier than the sequence number 3. The output-side pipe worker Z ignores the output data transmitted together with the sequence numbers 6 and 7, which are equal to or earlier than the sequence number 7.

Here, "ignoring the output data" in the output-side pipe worker 40 means that the output-side worker 15, which is the source of transmission of the output data, recognizes that transmission of this output data successfully completes, while this output data is not actually forwarded to the input-side pipe worker 50. The ignored output data may be deleted in the output-side pipe worker 40.

As a result, the communication on and after the sequence number conforming to the execution states of the input-side workers P, Q, and R is carried out.

FIG. 8 is a schematic view illustrating an example of operations when failure occurs in the input-side distributed program in the distributed execution system 1 according to the first exemplary embodiment. In the state illustrated in FIG. 6, in the case where failure occurs in the input-side node Q, executions in the input-side workers P, Q, and R and the output-side workers X, Y, and Z are stopped after the failure in the input-side worker Q is detected. Further, a spare node Q' is secured as a replacement for the node Q, and an input-side worker Q' and an input-side pipe worker Q' are newly activated on the spare node Q'. Then, the input-side workers P, Q' and R are restored to the most recently stored execution states 4, 3, and 4, and the output-side pipe workers X, Y, and Z are notified of the sequence number 4, 3, and 4 corresponding to the restoration states of the input-side workers P, Q', and R as the restore sequence numbers.

On the other hand, the output-side workers X, Y, and Z are restored to the execution states 3, 2, and 2 as the execution states on and before the restoration state of the input-side workers P, Q', and R. Here, as for the output-side worker Z, as illustrated in FIG. 6, the data on the most recently stored execution state 6 and the data on the execution state 2 stored before this are stored in the execution state DB 60. However, the most recently stored execution state 6 is newer than the state 4 to which the input-side worker R is restored, and hence, the output-side worker Z is restored to the execution state 2.

With the resumption of executions, the output-side workers X, Y, and Z try to start communication corresponding to the sequence numbers 3, 2, and 2 in accordance with the restored execution state. On the other hand, the output-side pipe workers X, Y, and Z ignore the communication corresponding to the sequence number equal to or earlier than the notified restore sequence number. More specifically, the output-side pipe worker X ignores the output data transmitted together with the sequence numbers 3 and 4, which are equal to or earlier than the sequence number 4. The output-side pipe worker Y ignores the output data transmitted together with the sequence numbers 2 and 3, which are equal to or earlier than the sequence number 3. The output-side pipe worker Z ignores the output data transmitted together with the sequence numbers 2 to 4, which are equal to or earlier than the sequence number 4. As a result, the communication on and after the sequence number conforming to the execution states of the input-side workers P, Q', and R is carried out.

It should be noted that, in the above-described first exemplary embodiment, it is assumed that failure occurs in the nodes 70 on which the program workers operate. This is because, since there are a large number of nodes 70 for operating workers, it is highly probable that failure occurs in one of the large number of nodes 70. Since the number of nodes 70 for operating masters is equal to the number of programs and pipes, the probability that failure occurs in the nodes 70 on which the masters operate is lower.

Supplement for First Exemplary Embodiment

The connection mode between the output-side pipe worker 40 and the input-side pipe worker 50 may be one-to-one, or one-to-many, or many-to-one as illustrated in FIG. 9A and FIG. 9B although specific description has not been made in the description above. FIG. 9A is a schematic view illustrating a one-to-one connection mode and a one-to-multiple connection mode between the output-side pipe worker 40 and the input-side pipe worker 50. FIG. 9B is a schematic view illustrating a multiple-to-one connection mode between the output-side pipe worker 40 and the input-side pipe worker 50.

In the example illustrated in FIG. 9A, the output-side pipe worker 40 on the node Y is connected to the input-side pipe worker 50 on the node Q and the input-side pipe worker 50 on the node R. In this case, for example, the worker controlling unit 32 of the pipe master 30 gives an instruction for the output-side pipe worker 40 to assign the data. In response to the instruction made by the pipe master 30, the communication unit 42 of the output-side pipe worker 40 switches, between two input-side pipe workers 50, the transmission destination of the output data and the sequence number acquired from the output-side worker 15 on the node Y through the program connecting unit 41.

The restore sequence number notified to the output-side pipe worker 40 at the time of recovery from failure is set to the maximum value of the sequence number for each of the output-side pipe workers 40 as described above (see S405 in FIG. 4). For example, in the case where the latest sequence number retained in the input-side pipe worker 50 on the node Q is 6, and the latest sequence number retained in the input-side pipe worker 50 on the node R is 4, the maximum value of the sequence number in relation to the output-side pipe worker 40 on the node Y is 6, and hence, the sequence number 6 is notified to the output-side pipe worker 40 on the node Y as the restore sequence number.

In the example illustrated in FIG. 9B, each of the output-side pipe workers 40 on the node X and the node Z is connected to the input-side pipe worker 50 on the node Q. Such a mode is applied, for example, to the following case. It is assumed that the output-side worker 15 on the node Y ends its processes in a configuration in which the output-side worker 15 on the node X outputs data to the node P, the output-side worker 15 on the node Y outputs data to node Q, and the output-side worker 15 on the node Z outputs data to the node R. In this case, the input-side worker 25 on the node Q does not have any data input thereinto, and hence, stops its processes. This does not lead to an efficient use of resources, and hence, the node Q is caused to process the output data from other nodes (node X and node Z). This is the mode illustrated in the example in FIG. 9B.

This mode is realized, for example, by the input-side pipe worker 50 on the node Q that does not have any data input thereinto and makes a request to the pipe master 30. Upon receiving this request, the pipe master 30 selects at least one output-side pipe worker 40 from among the output-side pipe workers 40 that continuously output the data, and gives an instruction for the selected output-side pipe worker 40 to allocate the data to the input-side pipe worker 50 that is the source of request and does not have any input data.

In this mode, it is only necessary that the input-side pipe worker 50 retains information with which the output-side pipe worker 40 serving as the source of transmission of the sequence number and the output data can be identified, and the latest sequence number concerning this output-side pipe worker 40. More specifically, the input-side pipe worker 50 on the node Q retains the latest sequence number from among the sequence numbers transmitted from the output-side pipe worker 40 on the node Y, the latest sequence number from among the sequence numbers transmitted from the output-side pipe worker 40 on the node X, and the latest sequence number from among the sequence numbers transmitted from the output-side pipe worker 40 on the node Z.

In the descriptions above, an example has been given in which one output-side first distributed program and one input-side second distributed program exchange data through one pipe. Each of the configurations of the first exemplary embodiment described above is similarly applicable to a mode in which one output-side distributed program is connected to plural input-side distributed programs. FIG. 10 is a diagram logically illustrating an example of a mode in which plural programs are connected through pipes. In FIG. 10, the program master and the program worker are not separately illustrated, and the pipe master and the pipe worker are not separately illustrated. Further, FIG. 10 only illustrates how programs and pipes are logically connected.

Figure 11:
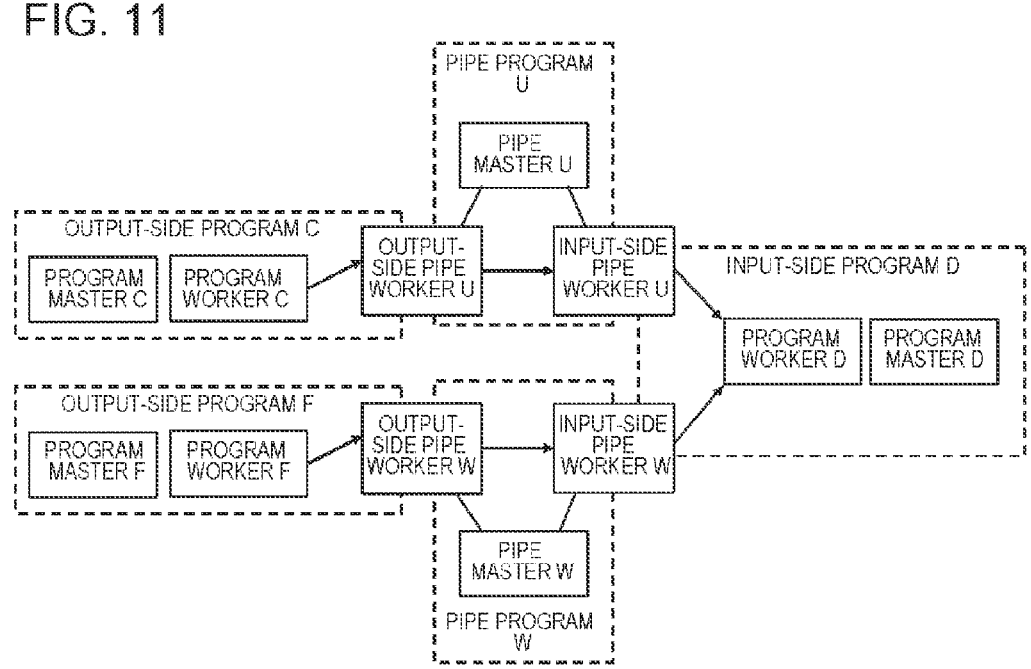
FIG. 11 is a schematic view illustrating an example of a configuration of a distributed execution system having connection between output-side programs C and F and an input-side program D.

FIG. 11 is a schematic view illustrating an example of a configuration of the distributed execution system 1 in which output-side programs C and F are connected to an input-side program D. As illustrated in FIG. 11, a program worker C transmits its output data to a program worker D through an output-side pipe worker U and an input-side pipe worker U, and a program worker F transmits its output data to a program worker D through an output-side pipe worker W and an input-side pipe worker W. At this time, the input-side program worker D is connected to the input-side pipe workers U and W.

In the case of a program connected to plural pipes as is the case with the program D in the example illustrated in FIG. 10 and FIG. 11, when the execution states are stored, the pipe masters of all the pipes that have been connected are notified that execution states are stored. More specifically, when the program D stores an execution state, each of the pipe masters 30 of the pipes U, V, and W is notified that the execution state is stored. The pipe masters 30 operate as described above.

In the descriptions of the first exemplary embodiment, when failure occurs in a worker of the input-side program (above-described second distributed program), the execution state of each worker of the output-side program (above-described first distributed program) is restored. In the case where the output-side program having an execution state to be restored serves as an input-side program by way of another pipe, the execution state of each worker of the output-side program by way of this pipe is also restored. In the example illustrated in FIG. 10, in the case where failure occurs in a worker of the program E, the execution state of the program D is restored through the pipe master 30 of the pipe V, and further, since the program D serves as the input-side program of the pipes U and W, the execution states of the program C and the program F are restored through each of the pipe masters 30.

The distributed execution system 1 having the mode as shown in the example illustrated in FIG. 10 and FIG. 11 operates in a similar manner to FIG. 2 to FIG. 5. However, the distributed program connected to plural pipes operates in a manner such that the notification destination and the notification source are plural pipe masters. For example, the processes of notification to the pipe master in the process S401 and the process S501 are performed to the pipe master of plural connected pipes. Further, as for the process S408 and the process S511, the execution state is restored to the most recently stored execution state and the execution is resumed after it is checked that notification of completing processes is received from all the connected pipe masters. Further, all the pipe masters whose program is on the input side are notified of the resumption of the execution.

In the case where failure occurs in the worker of the program E in the example illustrated in FIG. 10, the distributed execution system 1 restores the program D serving as the output side of the program E through the pipe V, and restores the programs C and F serving as the output side through the pipes U and W. In this case, the distributed execution system 1 operates in a basically similar manner to FIG. 5. The relationship between the program E and the program D corresponds to the relationship between the distributed program (input side) and the distributed program (output side) in FIG. 5, and the relationship between the program D and the program C and the relationship between the program D and the program F correspond to the relationship between the distributed program (input side) and the distributed program (output side) in FIG. 5.

More specifically, the program D receives a request to stop the execution from the pipe master 30 in the process S508. Considering that this corresponds to the process S501, the process S501 and thereafter are performed by excluding failure detection in the process S501, the process S502, and the process S503. After stopping its processes in the process S501, the program D, which has been switched from the output-side process to the input-side process, gives a notification to the pipe master 30 (pipes U and W) related to the program D on the input side (corresponding to S502). The program D causes this notification to include the state identifying information for identifying the execution state to be restored.

Each of the pipe masters 30 of the pipes U and W executes the process S505 to the process S509. In the process S506, each of the pipe masters 30 extracts, from the management DB 31, the state identifying information indicating a state at the same time as or prior to the execution state identified on the basis of the state identifying information notified as described above. With this operation, each of the programs C and F located on the upstream side restores its execution state to the execution state identified on the basis of the extracted state identifying information. In the process S511, the program D restores its state to this execution state, and resumes its execution.

Second Exemplary Embodiment

A distributed execution system 1 according to a second exemplary embodiment can be adapted to a case where a loop is contained in a connection mode between the distributed program and the pipe program. FIG. 12 is a diagram logically illustrating an example of a case where a loop is contained in a mode in which plural programs are connected through pipes.

Unlike the example illustrated in FIG. 10, in the example illustrated in FIG. 12, a loop is contained in the connection mode between the distributed programs and the pipe programs. In other words, all the programs play both roles of input side and output side. In this case, operations of restoring the state of the output-side distributed program to a state at the point in time when or before the input-side distributed program is restored make a loop, and diverge.

In this regard, in the distributed execution system 1 according to the second exemplary embodiment, the execution state is not stored by each of the distributed programs in an arbitrary manner, but each of the distributed programs stores the execution state in response to an instruction from a distributed program serving as a leader (hereinafter, referred to as a leader program). Note that the second exemplary embodiment does not limit the method of determining the leader program, and for example, a leader program is designated at the time when a program is activated.

Below, operations of the distributed execution system 1 according to the second exemplary embodiment will be described with focus being placed on things different from the first exemplary embodiment, and explanation of the details same as those described in the first exemplary embodiment will not be repeated. Further, in the description below, the output-side distributed program relative to the input-side distributed program is also referred to as an upstream, and the input-side distributed program relative to the output-side distributed program is also referred to as a downstream.

First, an operation performed at the time of storing an execution state will be described. This operation corresponds to the process S310 to the process S313, and the process S320 to the process S326 in FIG. 3.

At the time of storing an execution state, the leader program makes a request for each of the upstream distributed programs and the downstream distributed programs to store the execution state, after stopping the execution of the leader program itself. Note that each of the distributed programs is set so as to be able to receive data acquired from the upstream distributed program through the pipe during the time when the execution is stopped. For example, in the case where the program B is a leader program in FIG. 11, the program B makes a request for the upstream program A and the downstream program C to store the execution states. More specifically, in the case where the program B makes a request for the program A to store the execution state, the distributed execution system 1 operates in the following manner. The program master for the program B makes the request to a pipe master for a pipe X, and the pipe master for the pipe X makes the request to the program master for the program A. Hereinafter, when transfer of a request between programs is described, operations of the program master and the pipe master will not be described.

The leader program transmits, to each of the distributed programs, an execution-state storing request together with state identifying information (for example, name) with which the execution state to be stored can be identified.

The distributed program that receives the execution-state storing request first stops the executions of this distributed program itself. Then, this distributed program notifies the transmission source that the executions are stopped in the case where the transmission source of this execution-state storing request is the downstream program. In the example illustrated in FIG. 12, the program. A and the program C receive the execution-state storing request from the leader program B. However, the program A notifies the program B that the executions are stopped and the program C does not notify the program B to the effect.

The distributed program that receives the execution-state storing request further transmits the execution-state storing request to all the distributed programs connected through the pipe except for the transmission source of this execution-state storing request.

In the case where a loop is contained as illustrated in the example in FIG. 12, there is a distributed program that receives the execution-state storing request plural times. Such a distributed program judges whether this distributed program itself is processing the execution-state storing request or not. If the distributed program is processing the execution-state storing request, transmission of the execution-state storing request to other distributed programs is not performed to the execution-state storing request in the case of the second or additional times. However, if the transmission source of the execution-state storing request is the downstream program, such a distributed program notifies the transmission source that the executions are stopped.

The distributed program, which stops its own executions in response to the execution-state storing request and transmits the execution-state storing request to other distributed programs, stores its own execution state upon receiving the notification from all the upstream distributed programs of all the distributed programs serving as the transmission destination that the executions are stopped. This is because, since all the upstream programs stop, it is guaranteed that data is not inputted through the pipe, and hence, it is also guaranteed that the execution state of this distributed program is not changed due to data input through the pipe during the time when the execution state is being stored.

In the example illustrated in FIG. 12, the leader program B stores its own execution state upon receiving the notification from the program A that the executions are stopped. The program C does not transmit the execution-state storing request to the upstream program (for example, program B), and hence, stores its own execution state without waiting for the notification from other programs that the executions are stopped. Since the program A transmits the execution-state storing request to the upstream program C, it waits for the notification from the program C that the executions are stopped, and stores its own execution state.

Upon completing storing the execution state, each of the distributed programs notifies the pipe master 30 on the upstream side of the completion of storing the execution state together with the state identifying information for identifying the execution state (S311). In response to this notification, the pipe master 30 carries out the process S312 and the process S313, and then, notifies the upstream distributed program of the completion of storing the execution state, as in the first exemplary embodiment.

Upon receiving the notification of completion of storing the execution state from all the downstream programs, each of the distributed programs resumes its executions (S314). In the example illustrated in FIG. 12, the program B waits for the notification of completion of storing the execution state from the program C, and resumes its executions. The program A waits for the notification from the program B, and the program C waits for the notification from the program A.

Next, operations performed when failure occurs will be described. These operations correspond to the processes in FIG. 4 and FIG. 5. The operations performed when failure occurs in the output-side (upstream) program are similar to those in the first exemplary embodiment (FIG. 4), and hence, explanation thereof will not be made.

In the second exemplary embodiment, in the case where failure occurs in the input-side (downstream) program, the output-side program is restored to an execution state obtained at the same time when the execution state to which the input-side program is restored is obtained. Thus, in the process S506, the state identifying information on the output-side program, which is stored so as to be associated with the sequence number, which is the same as the sequence number extracted in the process (S505), is extracted. This is because, when the execution state is stored as described above, the upstream program and the downstream program store the execution state in synchronization with each other.

Modification Example of Hardware Configuration

In the first exemplary embodiment and the second exemplary embodiment described above, an example has been given in which the output-side distributed program (for example, the first distributed program) realizes the output-side master 10 and the output-side worker 15, and the input-side distributed program (for example, the second distributed program) realizes the input-side master 20 and the input-side worker 25. However, the present invention is not limited to the mode like this.

Figure 13:
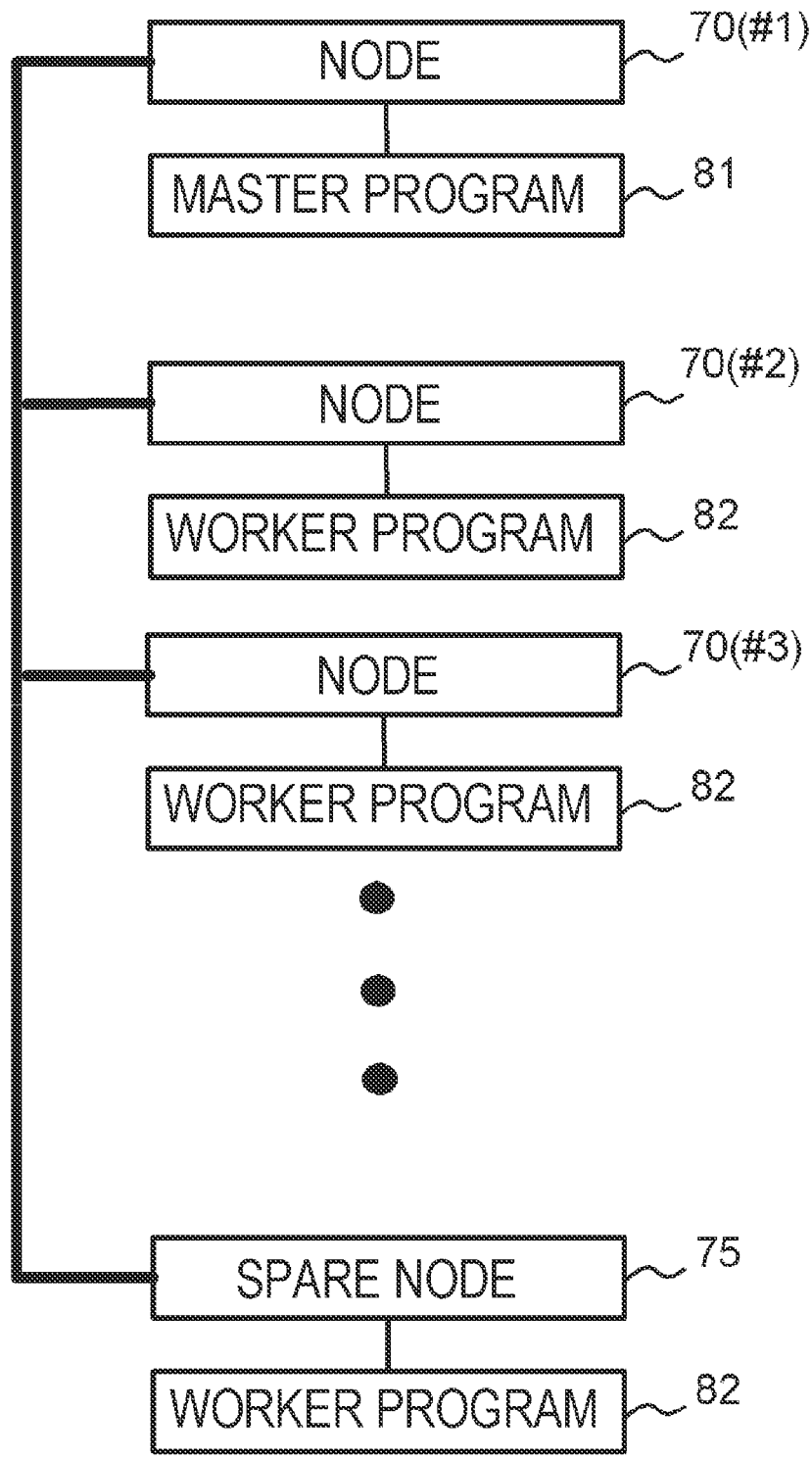
FIG. 13 is a schematic view illustrating relationships between nodes and distributed programs.

FIG. 13 is a schematic view illustrating a relationship between the nodes 70 and the distributed programs. As illustrated in FIG. 13, it may be possible that the output-side master 10, the input-side master 20, and the pipe master 30 are realized by a master program 81 being executed on the node 70 (#1), the output-side worker 15, the input-side worker 25, the output-side pipe worker 40, and the input-side pipe worker 50 are realized by a worker program 82 being executed, for example, on the node 70 (#2), and the spare worker is realized by a worker program 82 being executed on a spare node 75.

It should be noted that plural flowcharts used in the descriptions above specify plural steps in a sequential order. However, the order of the steps performed in the exemplary embodiment is not limited to the order of the steps specified. In the exemplary embodiment, the order of the steps illustrated in the drawings may be exchanged, provided that such exchange does not impair the details of the steps. Further, the above-described exemplary embodiment may be combined, provided that the details thereof do not contradict each other.

Part or all of the exemplary embodiment described above can be described in a manner illustrated in the Supplementary Notes below. However, the exemplary embodiments described above are not limited to the descriptions below.

Supplemental Note 1

A distributed execution system that executes a first distributed program and a second distributed program connected through a pipe, including:
   an output-side pipe worker that operates on a node same as an output-side worker realized by the first distributed program; and
   an input-side pipe worker that operates on a node same as an input-side worker realized by the second distributed program, receives output data on the output-side worker from the output-side pipe worker, and transfers the output data to the input-side worker, in which
   the output-side pipe worker includes:
   a program connecting unit that acquires, from the output-side worker, output data together with a sequence number indicating an order of the output data to be transmitted to the input-side worker;
   an information acquiring unit that acquires a restore sequence number corresponding to an execution state of the input-side worker; and
   a first communication unit that compares the sequence number acquired by the program connecting unit and the restore sequence number acquired by the information acquiring unit, and does not forward, to the input-side pipe worker, the output data acquired together with the sequence number indicating the order equal to or earlier than the restore sequence number.

Supplemental Note 2

The distributed execution system according to Supplemental Note 1, in which
   the input-side pipe worker includes:
   a second communication unit that receives the output data and the sequence number transmitted from the output-side pipe worker; and
   a retaining unit that retains the latest sequence number for each output-side pipe worker serving as a transmission source on the basis of the sequence number received by the second communication unit,
   the distributed execution system further includes:
   a pipe master including a worker controlling unit that acquires the latest sequence number retained in the retaining unit of the input-side pipe worker, and transmits the acquired latest sequence number to the output-side pipe worker as the restore sequence number.

Supplemental Note 3

The distributed execution system according to Supplemental Note 2, in which
   the output-side pipe worker further includes
   a retaining unit that retains the latest sequence number corresponding to the output data transmitted by the first communication unit to the input-side pipe worker,
   the output-side worker and the input-side worker store an execution state at each point in time in a state where this execution state is associated with state identifying information for identifying the execution state,
   the pipe master further includes:
   an association retaining unit that acquires the latest sequence number retained in the retaining unit of the output-side pipe worker at a point in time when the output-side worker or the input-side worker stores the execution state, and retains the acquired latest sequence number and the state identifying information for identifying the stored execution state so as to be associated with each other, and
   the worker controlling unit of the pipe master transmits, as the restore sequence number, the sequence number retained in the association retaining unit so as to be associated with the state identifying information for identifying the execution state most recently stored by the input-side worker to the output-side pipe worker.

Supplemental Note 4

The distributed execution system according to Supplemental Note 3, in which
   the worker controlling unit of the pipe master transmits, to the output-side worker, the state identifying information concerning the output-side worker and retained in the association retaining unit so as to be associated with the sequence number indicating the order equal to or earlier than the sequence number transferred to the output-side pipe worker as the restore sequence number, and
   the output-side worker is restored to an execution state identified on the basis of the state identifying information transmitted from the pipe master from among the execution state stored.

Supplemental Note 5

The distributed execution system according to any one of Supplemental Notes 1 to 4, in which the second distributed program realizes plural input-side workers, each of which is provided with each of the input-side pipe workers, the first communication unit of the output-side pipe worker switches, between the input-side pipe workers, the transmission destination of the sequence number and the output data acquired by the program connecting unit, and the worker controlling unit of the pipe master collects the latest sequence number retained by the retaining unit of each of the input-side pipe workers, extracts the latest sequence number related to the output-side pipe worker from among the collected sequence number, and transmits the extracted latest sequence number to the output-side pipe worker as the restore sequence number.

Supplemental Note 6

A distributed execution system that executes plural distributed programs connected to each other through a pipe, including plural program workers that are realized by the plural distributed programs, acquire output data from upstream program workers through the pipe, and transmit output data of the plural programs workers themselves to downstream program workers, in which a leader program of the plural distributed programs stops an execution of a program worker realized by the leader program, and transmits an execution-state storing request to the upstream program worker and the downstream program worker, and each of the program workers that receives the execution-state storing request:
  stops its own execution;
  forwards the execution-state storing request to another program worker connected through the pipe other than a transmission source of the execution-state storing request;
  notifies all the downstream program workers serving as the transmission source of the execution-state storing request, that the stop of the execution is completed;
  stores its own execution state after receiving the notification that the stop of the execution is completed, from all the upstream program workers serving as a forwarding destination of the execution-state storing request;
  notifies the upstream program worker that the storing of the execution state is completed; and
  resumes its own execution after receiving the notification that the storing of the execution state is completed from all the downstream program workers.

Supplemental Note 7

A distributed program execution method performed by plural computers, including:

activating an output-side pipe worker that operates on a node same as an output-side worker realized by a first distributed program connected to a second distributed program through a pipe; and activating an input-side pipe worker that operates on a node same as an input-side worker realized by the second distributed program, receives output data on the output-side worker from the output-side pipe worker, and transfers the output data to the input-side worker, in which the output-side pipe worker:
  acquires, from the output-side worker, output data together with a sequence number indicating an order of the output data to be transmitted to the input-side worker;
  acquires a restore sequence number corresponding to an execution state of the input-side worker;
  compares the sequence number and the restore sequence number, and
  does not forward, to the input-side pipe worker, the output data acquired together with the sequence number indicating the order equal to or earlier than the restore sequence number.

Supplemental Note 8

The distributed program execution method according to Supplemental Note 7, in which the input-side pipe worker receives the output data and the sequence number transmitted from the output-side pipe worker, and retains the latest sequence number for each output-side pipe worker serving as a transmission source on the basis of the received sequence number, at least one computer of the plural computers activates a pipe master, and the pipe master acquires the latest sequence number retained in the input-side pipe worker, and transmits the acquired latest sequence number to the output-side pipe worker as the restore sequence number.

Supplemental Note 9

The distributed program execution method according to Supplemental Note 8, in which the output-side pipe worker retains the latest sequence number corresponding to the output data transmitted by the first communication unit to the input-side pipe worker, the output-side worker and the input-side worker store an execution state at each point in time in a state this execution state is associated with state identifying information for identifying the execution state, and the pipe master acquires the latest sequence number retained in the output-side pipe worker at a point in time when the output-side worker or the input-side worker stores the execution state, and retains the acquired latest sequence number and the state identifying information for identifying the stored execution state so as to be associated with each other, and transmits, as the restore sequence number, the sequence number retained so as to be associated with the state identifying information for identifying the execution state most recently stored by the input-side worker to the output-side pipe worker.

Supplemental Note 10

The distributed program execution method according to Supplemental Note 9, in which the pipe master transmits, to the output-side worker, the state identifying information concerning the output-side worker and retained in the association retaining unit so as to be associated with the sequence number indicating the order equal to or earlier than the sequence number transferred to the output-side pipe worker as the restore sequence number, and the output-side worker is restored to an execution state identified on the basis of the state identifying information transmitted from the pipe master from among the execution state stored.

Supplemental Note 11

The distributed program execution method according to anyone of Supplemental Notes 7 to 10, in which the second distributed program realizes plural input-side workers, each of which is provided with each of the input-side pipe workers, the output-side pipe worker switches, between the input-side pipe workers, the transmission destination of the sequence number and the output data acquired by the program connecting unit, and the pipe master collects the latest sequence number retained by each of the input-side pipe workers, extracts the latest sequence number related to the output-side pipe worker from among the collected sequence number, and transmits the extracted latest sequence number to the output-side pipe worker as the restore sequence number.

Supplemental Note 12

A distributed program execution method performed by plural computers, including:

activating plural program workers that are realized by plural distributed programs connected to each other through a pipe, acquire output data from upstream program workers through the pipe, and transmit output data of the plural program workers themselves to downstream program workers, in which a leader program of the plural distributed programs stops an execution of a program worker realized by the leader program, and transmits an execution-state storing request to the upstream program worker and the downstream program worker, and each of the program workers that receives the execution-state storing request:
  stops its own execution;
  forwards the execution-state storing request to another program worker connected through the pipe other than a transmission source of the execution-state storing request;
  notifies all the downstream program workers serving as the transmission source of the execution-state storing request, that the stop of the execution is completed;
  stores its own execution state after receiving the notification that the stop of the execution is completed, from all the upstream program workers serving as a forwarding destination of the execution-state storing request;
  notifies the upstream program worker that the storing of the execution state is completed; and
  resumes its own execution after receiving the notification that the storing of the execution state is completed from all the downstream program workers.

Supplemental Note 13

A distributed execution program that causes plural computers executing a first distributed program and a second distributed program connected through a pipe, to realize:

an output-side pipe worker that operates on a node same as an output-side worker realized by the first distributed program; and an input-side pipe worker that operates on a node same as an input-side worker realized by the second distributed program, receives output data on the output-side worker from the output-side pipe worker, and transfers the output data to the input-side worker, in which the output-side pipe worker includes:
  a program connecting unit that acquires, from the output-side worker, output data together with a sequence number indicating an order of the output data to be transmitted to the input-side worker;
  an information acquiring unit that acquires a restore sequence number corresponding to an execution state of the input-side worker; and
  a first communication unit that compares the sequence number acquired by the program connecting unit and the restore sequence number acquired by the information acquiring unit, and does not forward, to the input-side pipe worker, the output data acquired together with the sequence number indicating the order equal to or earlier than the restore sequence number.

Supplemental Note 14

The distributed execution program according to Supplemental Note 13, in which
  the input-side pipe worker includes:
  a second communication unit that receives the output data and the sequence number transmitted from the output-side pipe worker; and
  a retaining unit that retains the latest sequence number for each output-side pipe worker serving as a transmission source on the basis of the sequence number received by the second communication unit, and
  the distributed execution program causes at least one of the plural computers to further realize:
  a pipe master including a worker controlling unit that acquires the latest sequence number retained in the retaining unit of the input-side pipe worker, and transmits the acquired latest sequence number to the output-side pipe worker as the restore sequence number.

Supplemental Note 15

The distributed execution program according to Supplemental Note 14, in which
  the output-side pipe worker further includes:
  a retaining unit that retains the latest sequence number corresponding to the output data transmitted by the first communication unit to the input-side pipe worker,
  the output-side worker and the input-side worker store an execution state at each point in time in a state where this execution state is associated with state identifying information for identifying the execution state,
  the pipe master further includes:
  an association retaining unit that acquires the latest sequence number retained in the retaining unit of the output-side pipe worker at a point in time when the output-side worker or the input-side worker stores the execution state, and retains the acquired latest sequence number and the state identifying information for identifying the stored execution state so as to be associated with each other, and
  the worker controlling unit of the pipe master transmits, as the restore sequence number, the sequence number retained in the association retaining unit so as to be associated with the state identifying information for identifying the execution state most recently stored by the input-side worker to the output-side pipe worker.

Supplemental Note 16

The distributed execution program according to Supplemental Note 15, in which
  the worker controlling unit of the pipe master transmits, to the output-side worker, the state identifying information concerning the output-side worker and retained in the association retaining unit so as to be associated with the sequence number indicating the order equal to or earlier than the sequence number transferred to the output-side pipe worker as the restore sequence number, and the output-side worker is restored to an execution state identified on the basis of the state identifying information transmitted from the pipe master from among the execution state stored.

Supplemental Note 17

The distributed execution program according to anyone of Supplemental Notes 13 to 16, in which the second distributed program realizes plural input-side workers, each of which is provided with each of the input-side pipe workers, the first communication unit of the output-side pipe worker switches, between the input-side pipe workers, the transmission destination of the sequence number and the output data acquired by the program connecting unit, and the worker controlling unit of the pipe master collects the latest sequence number retained by the retaining unit of each of the input-side pipe workers, extracts the latest sequence number related to the output-side pipe worker from among the collected sequence number, and transmits the extracted latest sequence number to the output-side pipe worker as the restore sequence number.

Supplemental Note 18

A distributed execution program that causes plural computers executing plural distributed programs connected to each other through a pipe to realize:

plural programs workers that are realized by the plural distributed programs, acquire output data from upstream program workers through the pipe, and transmit output data of the plurality of program workers themselves to downstream program workers, in which a leader program of the plural distributed programs stops an execution of a program worker realized by the leader program, and transmits an execution-state storing request to the upstream program worker and the downstream program worker, and each of the program workers that receives the execution-state storing request:

stops its own execution;
forwards the execution-state storing request to another program worker connected through the pipe other than a transmission source of the execution-state storing request;
notifies all the downstream program workers serving as the transmission source of the execution-state storing request, that the stop of the execution is completed;
stores its own execution state after receiving the notification that the stop of the execution is completed, from all the upstream program workers serving as a forwarding destination of the execution-state storing request;
notifies the upstream program worker that the storing of the execution state is completed; and
resumes its own execution after receiving the notification that the storing of the execution state is completed from all the downstream program workers.

Supplemental Note 19

A computer-readable storage medium that stores the program according to any one of Supplemental Notes 13 to 18.

The present application claims priority based on Japanese Patent Application No. 2011-150619 filed in Japan on Jul. 7, 2011, the disclosures of which are incorporated herein by reference in their entirety.

The invention claimed is:

1. A distributed execution system that executes a first distributed program and a second distributed program connected through a pipe, comprising:

a processor;
an output-side pipe worker that operates on a first node comprising the processor, and transmits output-data acquired from an output-side worker to an input-side pipe worker, the output-side worker being realized by the first distributed program and operating on the first node;
the input-side pipe worker that operates on a second, receives the output data from the output-side pipe worker, and transfers the output data to an input-side worker, the input-side worker being realized by the second distributed program and operating on the second node; and
a pipe master including a worker controlling unit,
wherein the output-side pipe worker includes:
  a program connecting unit that acquires the output data together with an output-side sequence number from the output-side worker, the output-side sequence number indicating an order of the transmission of the corresponding output data to the input-side pipe worker;
  an information acquiring unit that acquires an input-side sequence number from the worker controlling unit of the pipe master; and
  a first communication unit that compares the output-side sequence number acquired by the program connecting unit and the input-side sequence number acquired by the information acquiring unit, and does not forward the output data to the input-side pipe worker when the output data is acquired together with the output-side sequence number indicating the order equal to or earlier than the input-side sequence number,
wherein the input-side pipe worker includes:
a second communication unit that receives the output data and the output-side sequence number transmitted from the output-side pipe worker; and
a retaining unit that retains the latest output-side sequence number that is received by the second communication unit,
wherein the worker controlling unit of the pipe master acquires the latest output-side sequence number retained in the retaining unit of the input-side pipe worker, and transmits the acquired latest output-side sequence number to the output-side pipe worker as the input-side sequence number.

2. The distributed execution system according to claim 1, wherein the output-side pipe worker further includes a retaining unit that retains the latest output-side sequence number corresponding to the output data transmitted by the first communication unit to the input-side pipe worker,
wherein the output-side worker and the input-side worker store an execution state thereof at each of a plurality of points in time, the execution state being stored in association with state identifying information that identifies the execution state,
wherein the pipe master further includes an association retaining unit that acquires the latest output-side sequence number retained in the retaining unit of the output-side pipe worker at a point in time when the output-side worker or the input-side worker stores the execution state, and retains the acquired latest output-side sequence number and the state identifying information that identifies the stored execution state so as to be associated with each other, and wherein the worker controlling unit of the pipe master transmits, as the input-side sequence number, the output-side sequence number retained in the association retaining unit in association with the state identifying information that identifies the execution state most recently stored by the input-side worker to the output-side pipe worker.

3. The distributed execution system according to claim 2, wherein the worker controlling unit of the pipe master transmits, to the output-side worker, the state identifying information retained in the association retaining unit in association with the output-side sequence number indicating the order equal to or earlier than the input-side sequence number transmitted to the output-side pipe worker, and wherein the output-side worker is restored to an execution state identified on the basis of the state identifying information transmitted from the pipe master.

4. The distributed execution system according to claim 1, wherein the second distributed program realizes a plurality of input-side workers, each of which is provided with each of the input-side pipe workers, wherein the first communication unit of the output-side pipe worker switches, between the input-side pipe workers, the transmission destination of the output-side sequence number and the output data acquired by the program connecting unit, and wherein the worker controlling unit of the pipe master collects each of the latest output-side sequence numbers retained by the retaining unit of each of the input-side pipe workers, extracts the output-side sequence number that is latest of the collected latest output-side sequence numbers and related to the output-side pipe worker, and transmits the extracted output-side sequence number to the output-side pipe worker as the input-side sequence number.

5. A distributed program execution method performed by plural computers, including:

activating an output-side pipe worker that operates on a first node, and transmitting output-data acquired from an output-side worker to an input-side pipe worker, the output-side worker being realized by a first distributed program connected to a second distributed program through a pipe and operating on the first node; and activating the input-side pipe worker that operates on a second node receiving the output data from the output-side pipe worker, and transferring the output data to an input-side worker, the input-side worker being realized by the second distributed program and operating on the second node, wherein
the output-side pipe worker:
acquires the output data together with an output-side sequence number from the output-side worker, the output-side sequence number indicating an order of the transmission of the corresponding output data to the input-side pipe worker;
acquires an input-side sequence number;
compares the output-side sequence number and the input-side sequence number; and
does not forward the output data to the input-side pipe worker when the output data is acquired together with the output-side sequence number indicating the order equal to or earlier than the input-side sequence number, wherein the input-side pipe worker:
receives the output data and the output-side sequence number transmitted from the output-side pipe worker; and
retains the latest output-side sequence number, wherein a pipe master acquires the latest output-side sequence number, and transmits the acquired latest output-side sequence number to the output-side pipe worker as the input-side sequence number.

6. A non-transitory computer-readable storage medium storing a distributed execution program that causes a plurality of computers executing a first distributed program and a second distributed program connected through a pipe, to realize:

an output-side pipe worker that operates on a first node, and transmits output-data acquired from an output-side worker to an input-side pipe worker, the output-side worker being realized by the first distributed program and operating on the first node;

the input-side pipe worker that operates on a second node, receives the output data from the output-side pipe worker, and transfers the output data to an input-side worker, the input-side worker being realized by the second distributed program and operating on the second node; and a pipe master including a worker controlling unit,
wherein the output-side pipe worker includes:
a program connecting unit that acquires the output data together with an output-side sequence number from the output-side worker, the output-side sequence number indicating an order of the transmission of the corresponding output data to the input-side pipe worker;
an information acquiring unit that acquires an input-side sequence number from the worker controlling unit of the pipe master; and
a first communication unit that compares the output-side sequence number acquired by the program connecting unit and the input-side sequence number acquired by the information acquiring unit, and does not forward the output data to the input-side pipe worker when the output data is acquired together with the output-side sequence number indicating the order equal to or earlier than the input-side sequence number, wherein the input-side pipe worker includes:
a second communication unit that receives the output data and the output-side sequence number transmitted from the output-side pipe worker; and
a retaining unit that retains the latest output-side sequence number that is received by the second communication unit, wherein the worker controlling unit of the pipe master acquires the latest output-side sequence number retained in the retaining unit of the input-side pipe worker, and transmits the acquired latest output-side sequence number to the output-side pipe worker as the input-side sequence number.

* * * * *